US007275159B2

(12) United States Patent
Hull et al.

(10) Patent No.: US 7,275,159 B2
(45) Date of Patent: Sep. 25, 2007

(54) MULTIMEDIA OUTPUT DEVICE HAVING EMBEDDED ENCRYPTION FUNCTIONALITY

(75) Inventors: Jonathan J. Hull, San Carlos, CA (US); Michael J. Gormish, Redwood City, CA (US); Kurt W. Piersol, Santa Cruz, CA (US)

(73) Assignee: Ricoh Company, Ltd., Tokyo (JP)

( * ) Notice: Subject to any disclaimer, the term of this patent is extended or adjusted under 35 U.S.C. 154(b) by 695 days.

(21) Appl. No.: 10/814,841

(22) Filed: Mar. 30, 2004

(65) Prior Publication Data

US 2005/0050344 A1 Mar. 3, 2005

Related U.S. Application Data

(63) Continuation-in-part of application No. 10/639,282, filed on Aug. 11, 2003.

(60) Provisional application No. 60/506,303, filed on Sep. 25, 2003, provisional application No. 60/506,302, filed on Sep. 25, 2003.

(51) Int. Cl.
*G06F 9/24* (2006.01)
(52) U.S. Cl. .................. 713/171; 713/182; 713/189; 713/193
(58) Field of Classification Search ............ 713/171, 713/182, 189, 193
See application file for complete search history.

(56) References Cited

U.S. PATENT DOCUMENTS

| 4,133,007 | A | 1/1979 | Wessler et al. |
| 4,205,780 | A | 6/1980 | Burns et al. |
| 4,417,239 | A | 11/1983 | Demke et al. |
| 4,635,132 | A | 1/1987 | Nakamura |
| 4,734,898 | A | 3/1988 | Morinaga |
| 4,754,485 | A | 6/1988 | Klatt |
| 4,807,186 | A | 2/1989 | Ohnishi et al. |
| 4,823,303 | A | 4/1989 | Terasawa |
| 4,881,135 | A | 11/1989 | Heilweil |
| 4,907,973 | A | 3/1990 | Hon |
| 4,987,447 | A | 1/1991 | Ojha |

(Continued)

FOREIGN PATENT DOCUMENTS

CN  1097394 C  12/2002

(Continued)

OTHER PUBLICATIONS

ASCII 24.com, [online] (date unknown), Retrieved from the Internet<URL: http://216.239.37.104/search?q=cache:z-G9M1EpvSUJ:ascii24.com/news/i/hard/article/1998/10/01/612952-000.html+%E3%82%B9%E3%...>.

(Continued)

*Primary Examiner*—Thomas R. Peeso
(74) *Attorney, Agent, or Firm*—Fenwick & West LLP

(57) ABSTRACT

A multimedia output device having embedded encryption functionality enables the outputting of content in an encrypted form. The multimedia output device receives the content to be encrypted, encrypts the content, and generates an electronic output of the encrypted content. The multimedia output device also generates an associated paper output that provides information about the decryption, such as a key, an identification of the electronic output of the encrypted content, and optionally a description of the contents of the content encrypted.

45 Claims, 16 Drawing Sheets

U.S. PATENT DOCUMENTS

| | | |
|---|---|---|
| 4,998,215 A | 3/1991 | Black et al. |
| 5,060,135 A | 10/1991 | Levine et al. |
| 5,091,948 A | 2/1992 | Kametani |
| 5,093,730 A | 3/1992 | Ishii et al. |
| 5,115,967 A | 5/1992 | Wedekind |
| 5,136,563 A | 8/1992 | Takemasa et al. |
| 5,153,831 A | 10/1992 | Yianitos |
| 5,161,037 A | 11/1992 | Saito |
| 5,168,371 A | 12/1992 | Takayanagi |
| 5,170,935 A | 12/1992 | Federspiel et al. |
| 5,225,900 A | 7/1993 | Wright |
| 5,243,381 A | 9/1993 | Hube |
| 5,255,389 A | 10/1993 | Wang |
| 5,267,303 A | 11/1993 | Johnson et al. |
| 5,270,989 A | 12/1993 | Kimura |
| 5,280,609 A | 1/1994 | MacPhail |
| 5,299,123 A | 3/1994 | Wang et al. |
| 5,309,359 A | 5/1994 | Katz et al. |
| 5,349,658 A | 9/1994 | O'Rourke et al. |
| 5,369,508 A | 11/1994 | Lech et al. |
| 5,384,703 A | 1/1995 | Withgott et al. |
| 5,386,510 A | 1/1995 | Jacobs |
| 5,404,295 A | 4/1995 | Katz et al. |
| 5,418,948 A | 5/1995 | Turtle |
| 5,432,532 A | 7/1995 | Mochimaru et al. |
| 5,436,792 A | 7/1995 | Leman et al. |
| 5,438,426 A | 8/1995 | Miake et al. |
| 5,442,795 A | 8/1995 | Levine et al. |
| 5,444,476 A | 8/1995 | Conway et al. |
| 5,448,375 A | 9/1995 | Cooper et al. |
| 5,459,307 A | 10/1995 | Klotz, Jr. |
| 5,468,371 A | 11/1995 | Nelson et al. |
| 5,479,600 A | 12/1995 | Wroblewski et al. |
| 5,481,666 A | 1/1996 | Nguyen et al. |
| 5,490,217 A | 2/1996 | Wang et al. |
| 5,493,409 A | 2/1996 | Maeda et al. |
| 5,499,108 A | 3/1996 | Cotte et al. |
| 5,568,406 A | 10/1996 | Gerber |
| 5,581,682 A | 12/1996 | Anderson et al. |
| 5,596,700 A | 1/1997 | Darnell et al. |
| 5,633,723 A | 5/1997 | Sugiyama et al. |
| 5,638,543 A | 6/1997 | Pedersen et al. |
| 5,661,783 A | 8/1997 | Assis |
| 5,680,223 A | 10/1997 | Cooper et al. |
| 5,680,636 A | 10/1997 | Levine et al. |
| 5,682,330 A | 10/1997 | Seaman et al. |
| 5,686,957 A | 11/1997 | Baker |
| 5,690,496 A | 11/1997 | Kennedy |
| 5,694,559 A | 12/1997 | Hobson et al. |
| 5,710,874 A | 1/1998 | Bergen |
| 5,715,381 A | 2/1998 | Hamilton |
| 5,717,879 A | 2/1998 | Moran et al. |
| 5,721,883 A | 2/1998 | Katsuo et al. |
| 5,721,897 A | 2/1998 | Rubinstein et al. |
| 5,729,665 A | 3/1998 | Gauthier |
| 5,734,752 A | 3/1998 | Knox |
| 5,734,753 A | 3/1998 | Bunce |
| 5,737,599 A | 4/1998 | Rowe et al. |
| 5,748,805 A | 5/1998 | Withgott et al. |
| 5,751,283 A | 5/1998 | Smith |
| 5,754,308 A | 5/1998 | Lopresti et al. |
| 5,754,939 A | 5/1998 | Herz et al. |
| 5,760,767 A | 6/1998 | Shore et al. |
| 5,761,655 A | 6/1998 | Hoffman |
| 5,761,686 A | 6/1998 | Bloomberg |
| 5,764,368 A | 6/1998 | Shibaki et al. |
| 5,765,176 A | 6/1998 | Bloomberg |
| 5,774,260 A | 6/1998 | Petitto et al. |
| 5,778,397 A | 7/1998 | Kupiec et al. |
| 5,781,785 A | 7/1998 | Rowe et al. |
| 5,784,616 A | 7/1998 | Horvitz |
| 5,793,365 A | 8/1998 | Tang et al. |
| 5,802,294 A | 9/1998 | Ludwig et al. |
| 5,812,664 A | 9/1998 | Bernobich et al. |
| 5,819,301 A | 10/1998 | Rowe et al. |
| 5,832,474 A | 11/1998 | Lopresti et al. |
| 5,838,317 A | 11/1998 | Bolnick et al. |
| 5,857,185 A | 1/1999 | Yamamura |
| 5,860,074 A | 1/1999 | Rowe et al. |
| 5,870,552 A | 2/1999 | Dozier et al. |
| 5,870,770 A | 2/1999 | Wolfe |
| 5,873,107 A | 2/1999 | Borovoy et al. |
| 5,884,056 A | 3/1999 | Steele |
| 5,892,536 A | 4/1999 | Logan et al. |
| 5,903,538 A | 5/1999 | Fujita et al. |
| 5,933,841 A | 8/1999 | Schumacher et al. |
| 5,936,542 A | 8/1999 | Kleinrock et al. |
| 5,940,776 A | 8/1999 | Baron et al. |
| 5,943,679 A | 8/1999 | Niles et al. |
| 5,946,678 A | 8/1999 | Aalbersberg |
| 5,950,187 A | 9/1999 | Tsuda |
| 5,978,477 A | 11/1999 | Hull et al. |
| 5,982,507 A | 11/1999 | Weiser et al. |
| 5,986,655 A | 11/1999 | Chiu et al. |
| 5,986,692 A | 11/1999 | Logan et al. |
| 5,987,226 A | 11/1999 | Ishikawa et al. |
| 5,987,454 A | 11/1999 | Hobbs |
| 5,990,934 A | 11/1999 | Nalwa |
| 5,999,173 A | 12/1999 | Ubillos |
| 6,000,030 A | 12/1999 | Steinberg et al. |
| 6,006,218 A | 12/1999 | Breese et al. |
| 6,009,442 A | 12/1999 | Chen et al. |
| 6,021,403 A | 2/2000 | Horvitz et al. |
| 6,026,409 A | 2/2000 | Blumenthal |
| 6,028,601 A | 2/2000 | Machiraju et al. |
| 6,055,542 A | 4/2000 | Nielsen et al. |
| 6,094,648 A | 7/2000 | Aalbersberg et al. |
| RE36,801 E | 8/2000 | Logan et al. |
| 6,101,503 A | 8/2000 | Cooper et al. |
| 6,106,457 A | 8/2000 | Perkins et al. |
| 6,115,718 A | 9/2000 | Huberman et al. |
| 6,118,888 A | 9/2000 | Chino et al. |
| 6,138,151 A | 10/2000 | Reber et al. |
| 6,153,667 A | 11/2000 | Howald |
| 6,170,007 B1 | 1/2001 | Venkatraman et al. |
| 6,175,489 B1 | 1/2001 | Markow et al. |
| 6,182,090 B1 | 1/2001 | Peairs |
| 6,189,009 B1 | 2/2001 | Stratigos et al. |
| 6,193,658 B1 | 2/2001 | Wendelken et al. |
| 6,262,724 B1 | 7/2001 | Crow et al. |
| 6,296,693 B1 | 10/2001 | McCarthy |
| 6,297,851 B1 | 10/2001 | Taubman et al. |
| 6,298,145 B1 | 10/2001 | Zhang et al. |
| 6,301,660 B1 | 10/2001 | Benson |
| 6,302,527 B1 | 10/2001 | Walker |
| 6,308,887 B1 | 10/2001 | Korman et al. |
| 6,332,147 B1 | 12/2001 | Moran et al. |
| 6,369,811 B1 | 4/2002 | Graham et al. |
| 6,373,498 B1 | 4/2002 | Abgrall |
| 6,373,585 B1 | 4/2002 | Mastie et al. |
| 6,375,298 B2 | 4/2002 | Purcell et al. |
| 6,378,070 B1 | 4/2002 | Chan et al. |
| 6,409,401 B1 | 6/2002 | Petteruti et al. |
| 6,417,435 B2 | 7/2002 | Chantzis et al. |
| 6,421,738 B1 | 7/2002 | Ratan et al. |
| 6,442,336 B1 | 8/2002 | Lemelson |
| 6,452,615 B1 | 9/2002 | Chiu et al. |
| 6,466,329 B1 | 10/2002 | Shunichi |
| 6,466,534 B2 | 10/2002 | Cundiff, Sr. |
| 6,476,793 B1 | 11/2002 | Motoyama et al. |
| D468,277 S | 1/2003 | Sugiyama |
| 6,519,360 B1 | 2/2003 | Tanaka |
| 6,529,920 B1 | 3/2003 | Arons et al. |
| 6,535,639 B1 | 3/2003 | Uchihachi et al. |

| | | |
|---|---|---|
| 6,552,743 B1 | 4/2003 | Rissman |
| 6,594,377 B1 | 7/2003 | Kim et al. |
| 6,611,622 B1 | 8/2003 | Krumm |
| 6,611,628 B1 | 8/2003 | Sekiguchi et al. |
| 6,665,092 B2 | 12/2003 | Reed |
| 6,674,538 B2 | 1/2004 | Takahashi |
| 6,687,383 B1 | 2/2004 | Kanevsky et al. |
| 6,700,566 B2 | 3/2004 | Shimoosawa et al. |
| 6,724,494 B1 | 4/2004 | Danknick |
| 6,750,978 B1 | 6/2004 | Marggraff et al. |
| 6,752,317 B2 | 6/2004 | Dymetman et al. |
| 6,774,951 B2 | 8/2004 | Narushima |
| 6,775,651 B1 | 8/2004 | Lewis et al. |
| 6,807,303 B1 | 10/2004 | Kim et al. |
| 6,824,044 B1 | 11/2004 | Lapstun et al. |
| 6,856,415 B1 | 2/2005 | Simchik et al. |
| 6,892,193 B2 | 5/2005 | Bolle et al. |
| 6,938,202 B1 | 8/2005 | Matsubayashi et al. |
| 6,964,374 B1 | 11/2005 | Djuknic et al. |
| 6,983,482 B2 | 1/2006 | Morita et al. |
| 7,031,965 B1 | 4/2006 | Moriya et al. |
| 7,075,676 B2 | 7/2006 | Owen |
| 7,131,058 B1 | 10/2006 | Lapstun |
| 2001/0003846 A1 | 6/2001 | Rowe et al. |
| 2001/0017714 A1 | 8/2001 | Komatsu et al. |
| 2001/0037408 A1 | 11/2001 | Thrift et al. |
| 2001/0052942 A1 | 12/2001 | MacCollum et al. |
| 2002/0001101 A1 | 1/2002 | Hamura et al. |
| 2002/0004807 A1 | 1/2002 | Graham et al. |
| 2002/0006100 A1 | 1/2002 | Cundiff, Sr. et al. |
| 2002/0010641 A1 | 1/2002 | Stevens et al. |
| 2002/0015066 A1 | 2/2002 | Siwinski et al. |
| 2002/0048224 A1 | 4/2002 | Dygert et al. |
| 2002/0060748 A1 | 5/2002 | Aratani et al. |
| 2002/0067503 A1 | 6/2002 | Hiatt |
| 2002/0085759 A1 | 7/2002 | Davies et al. |
| 2002/0097426 A1 | 7/2002 | Gusmano et al. |
| 2002/0099534 A1 | 7/2002 | Hegarty |
| 2002/0101513 A1 | 8/2002 | Halverson |
| 2002/0135800 A1 | 9/2002 | Dutta |
| 2002/0140993 A1 | 10/2002 | Silverbrook |
| 2002/0159637 A1 | 10/2002 | Echigo et al. |
| 2002/0163653 A1 | 11/2002 | Struble et al. |
| 2002/0169849 A1 | 11/2002 | Schroath |
| 2002/0171857 A1 | 11/2002 | Hisatomi et al. |
| 2002/0185533 A1 | 12/2002 | Shieh et al. |
| 2002/0199149 A1 | 12/2002 | Nagasaki et al. |
| 2003/0002068 A1 | 1/2003 | Constantin et al. |
| 2003/0007776 A1 | 1/2003 | Kameyama et al. |
| 2003/0038971 A1 | 2/2003 | Renda |
| 2003/0051214 A1 | 3/2003 | Graham et al. |
| 2003/0084462 A1 | 5/2003 | Kubota et al. |
| 2003/0088582 A1 | 5/2003 | Pflug |
| 2003/0093384 A1 | 5/2003 | Durst et al. |
| 2003/0110926 A1 | 6/2003 | Sitrick et al. |
| 2003/0117652 A1 | 6/2003 | Lapstun |
| 2003/0121006 A1 | 6/2003 | Tabata et al. |
| 2003/0130952 A1 | 7/2003 | Bell et al. |
| 2003/0160898 A1 | 8/2003 | Baek et al. |
| 2003/0163552 A1 | 8/2003 | Savitzky et al. |
| 2003/0184598 A1 | 10/2003 | Graham |
| 2003/0220988 A1 | 11/2003 | Hymel |
| 2004/0090462 A1 | 5/2004 | Graham |
| 2004/0128613 A1 | 7/2004 | Sinisi |
| 2004/0143602 A1 | 7/2004 | Ruiz et al. |
| 2004/0240541 A1 | 12/2004 | Chadwick et al. |
| 2004/0249650 A1 | 12/2004 | Freedman et al. |
| 2005/0064935 A1 | 3/2005 | Blanco |
| 2007/0033419 A1 | 2/2007 | Kocher et al. |

FOREIGN PATENT DOCUMENTS

| | | |
|---|---|---|
| EP | 378 848 A2 | 7/1990 |
| EP | 459 174 A2 | 12/1991 |
| EP | 737 927 A2 | 10/1996 |
| EP | 762 297 A2 | 3/1997 |
| EP | 802 492 A1 | 10/1997 |
| EP | 1 001 605 A3 | 5/2000 |
| EP | 1133170 A2 | 9/2001 |
| GB | 2 137 788 A | 10/1984 |
| GB | 2 156 118 A | 10/1985 |
| GB | 2 234 609 A | 2/1991 |
| GB | 2 290 898 A | 1/1996 |
| JP | 8-297677 A | 11/1996 |
| WO | WO99/18523 | 4/1999 |

OTHER PUBLICATIONS

Label Producer by Maxell, [online] [Retrieved on Nov. 11, 2003]. Retrieved from the Internet<URL: http://www.maxell.co.jp/products/consumer/rabel_card/>.

Movie-PhotoPrint by Canon, [online] [Retrieved on Nov. 11, 2003]. Retrieved from the Internet<URL: http://cweb.canon.jp/hps/guide/rimless.html>.

Print From Cellular Phone by Canon, [online] [Retrieved on Nov. 11, 2003]. Retrieved from the Internet<URL: http://cweb.canon.jp/bj/enjoy/pbeam/index.html>.

Print Images Plus Barcode by Fuji Xerox, [online] [Retrieved on Nov. 11, 2003]. Retrieved from the Internet<URL: http://www.fujixerox.co.jp/soft/cardgear/release.html>.

Print Scan-Talk By Barcode by Epson, [online] [Retrieved on Nov. 11, 2003]. Retrieved from the Internet<URL: http://www.epson.co.jp/osirase/2000/000217.htm>.

Printer With CD/DVD Tray, Print CD/DVD Label by Epson, [online] [Retrieved on Nov. 11, 2003]. Retrieved from the Internet<URL: http://www.i-love-epson.co.jp/products/printer/inkjet/pmd750/pmd7503.htm>.

R200 ScanTalk [online] (date unknown). Retrieved from the Internet<URL: http://homepage2.nifty.com/vasolza/ScanTalk.htm>.

Variety of Media In, Print Paper Out by Epson, [online] [Retrieved on Nov. 11, 2003]. Retrieved from the Internet<URL: http://www.i-love-epson.co.jp/products/spc/pma850/pma8503.htm>.

Dimitrova, N. et al., "Applications of Video-Content Analysis and Retrieval," IEEE Multimedia, Jul.-Sep. 2002, pp. 42-55.

European Search Report, EP 04255836, Sep. 12, 2006, 4 pages.
European Search Report, EP 04255837, Sep. 5, 2006, 3 pages.
European Search Report, EP 04255839, Sep. 4, 2006, 3 pages.
European Search Report, EP 04255840, Sep. 12, 2006, 3 pages.

Graham, J. et al., "A Paper-Based Interface for Video Browsing and Retrieval," ICME '03, Jul. 6-9, 2003, pp. 749-752, vol. 2.

Graham, J. et al., "Video Paper: A Paper-Based Interface for Skimming and Watching Video," ICCE '02, Jun. 18-20, 2002, pp. 214-215.

Klemmer, S.R. et al., "Books With Voices: Paper Transcripts as a Tangible Interface to Oral Histories," CHI Letters, Apr. 5-10, 2003, pp. 89-96, vol. 5, Issue 1.

Minami, K. et al., "Video Handling with Music and Speech Detection," IEEE Multimedia, Jul.-Sep. 1998, pp. 17-25.

Shahraray, B. et al., "Automated Authoring of Hypermedia Documents of Video Programs," ACM Multimedia '95 Electronic Proceedings, San Francisco, CA, Nov. 5-9, 1995, pp. 1-12.

Shahraray, B. et al., "Pictorial Transcripts: Multimedia Processing Applied to Digital Library Creation," IEEE, 1997, pp. 581-586.

Meyers et al., "Facsimile with Encrypted Hard Copy," IBM Technical Disclosure Bulletin, TDB Apr. 1, 1978, pp. 4994-4995, [online] [Retrieved on Apr. 7, 2006] Retrieved from the Internet<URL:http://www.ip.com/pubview/IPCOM000069447D>.

Lamming, M. et al., "Using Automatically Generated Descriptions of Human Activity to Index Multi-media Data," IEEE Multimedia Communications and Applications IEE Colloquium, Feb. 7, 1991, pp. 5/1-5/3.

Poon, K.M. et al., "Performance Analysis of Median Filtering on Meiko™—A Distributed Multiprocessor System," IEEE First International Conference on Algorithms and Architectures for Parallel Processing, 1995, pp. 631-639.

"Flowport, Paper that knows where it's going," specification sheet, 2 pages total.
<http://www.zdnet.com.au/printfriendly?AT=2000023555-20270277-4>, "Captured! Three document capture systems tested, Nov. 28, 2002," visited on Apr. 29, 2003, 9 pages total.
Lutz, Raymond, "BrowseFax Initiative," MPFA Information Site, downloaded from internet, http://www.mtpa.org/pub/browsefax_wp.htm on May 14, 2004.
Xerox FlowPort Software, Solutions for the Legal Market from Xerox, 2001 XEROX Corporation, 4 pages total.
Gropp, W. et al., "Using MPI-Portable Programming with the Message Passing Interface," copyright 1999, pp. 35-42, second edition, MIT Press.
Abdel-Mottaleb, M. et al., "Face Detection in Complex Environments From Color Images," IEEE ICIP 622-626, 1999.
Acrobat Reader Version 2.0 (software application), Adobe Systems Incorporated, screenshots Figures 1-10 (1994).
Adobe Acrobat Reader 3.0 screen dumps (fig. 1-3), 1996.
Adobe Premiere (video editing software) from http://www.adobe.com (2002).
Adobe Systems, Inc., "Adobe Photoshop 4.0 User Guide for Macintosh and Windows," 1996, Title Page, Copyright Page, Chap. 2, pp. 30-31.
Apple Macintosh system 7 reference manual, pp. 30-31 (1991).
Arons, B. "SpeechSkimmer: A System for Interactively Skimming Recorded Speech," ACM Transactions on Computer-Human Interaction 4(1):3-38.
Ball, Thomas et al., "Software Visualization in the Large," IEEE Computer, vol. 29, No. 4, Apr. 1996, pp. 33-43, http://www.computer.org/computer/co1996/r4033abs.htm.
Begole et al., "Flexible Collaboration Transparency," doc. ID: ncstri.vatach_cs/TR-98-11, Virginia Polytechnic Institute and State University, 1998.
Begole et al. "Flexible Collaboration Transparency: Supporting Worker Independence in Replicated Application-Sharing Systems," ACM Transactions On Computer-Human Interaction, Jun. 1999, pp. 95-132, vol. 6, No. 2.
Begole et al., "Supporting Worker Independence in Collaboration Transparency," ACM 0-58113-034-1/98/11, Virginia Polytechnic Institute and State University, pp. 133-142, 1998.
Begole et al., "Supporting Worker Independence in Collaboration Transparency," technical report from the Computer Science Department of Virginia Tech, doc. ID: ncstrl.vatech_cs/TR-98-12.
Bobick et al., "A State Based Approach to the Representation and Recognition of Gesture," IEEE Trans. On Pattern Analysis and Machine Intelligence, pp. 1325-1337, 1997.
Boguraev et al., "Salience-Based Content Characterization Of Text Documents," ACL/EACL'97 Intelligent Scalable Text Summarization Workshop Program, Jul. 11, 1997, 14 pages.
Boguraev et al., "Salience/based Content Characterization of Text Documents," in Proceedings of Workshop on Intelligent Scalable Text Summarization at the ACL/EACL Conference, Madrid, Spain, 12 pages, Jul. 7-12, 1997.
Boreczky, J. et al., "An Interactive Comic Book Presentation for Exploring Video," Conference on Human Factors in Computing Systems (CHI 2000), ACM Press, pp. 185-192, 2000.
Boykin et al., "Improving Broadcast News Segmentation Processing," IEEE Multimedia '99, 1999.
Boykin et al., "Machine Learning of Event Segmentation for News on Demand," Communications of the ACM, 43:35-41, 2000.
Brandow et al., "Automatic Condensation of Electronic Publications by Sentence Selection," Information Processing and Management, 31(5):875-685, 1995.
Brown et al., "Automatic Content-Based Retrieval of Broadcast News," ACM Multimedia 5, San Francisco, CA, 1995.
Byrd, D., "A Scrollbar-based visualization for Document Navigation," doc. ID:xxx.cs.IR/9902028, Computing Research Repository: Information Retrieval, 1999.
"c:\...\9149920c.wpd—unmodified" Screen Shots of document created in Corel WordPerfect, 4 pages (Apr. 30, 2002).
Chen et al., "Emotion Recognition from Audiovisual Information," Proc. IEEE Workshop on Multimedia Signal Processing, Los Angeles, CA, USA, pp. 83-88, 1998.

Chen et al., "ViBE: A Video Indexing and Browsing Environment," Proceedings of the SPIE Conference on Multimedia Storage and Archiving Systems, Sep. 20-22, 1999, Boston 3846:148-164, 1999.
Chiu et al., "NoteLook: Taking Notes in Meetings with Digital Video and Ink," ACM Multimedia 99 Orlando, 1999.
Chiu et al., "Automatically Linking Multimedia Meeting Documents by Image Matching," Proceedings of Hypertext '00, ACM, New York, pp. 244-245, 2000.
Christel et al., "Evolving Video Skims into Useful Multimedia Abstractions," Proceedings of the CHI '98 Conference on Human Factors in Computing Systems, pp. 171-178 Los Angeles, CA, Apr. 1998.
Christel et al., "Information Visualization Within a Digital Video Library," Journal of Intelligent Information Systems, 11:35-257, 1998.
Damiani, E. et al. "A Fine-Grained Access Control System for XML Documents," ACM Transactions on Information and System Security, May 2002, pp. 169-202, vol. 5, No. 2.
Dellaert et al., "Recognizing Emotion in Speech," Proceedings ICSLP 96, Fourth International Conference on Spoken Language Processing New York, IEEE vol. 1970-1973, Cat. No. 96TH8206), 1996.
Dimitrova et al., "Video Keyframe Extraction and Filtering: A Keyframe is not a Keyframe to Everyone," CIKM 1997:113-120, 1997.
Divakaran, A. et al., "Video Browsing System Based on Compressed Domain Feature Extraction," IEEE Transactions on Consumer Electronics 46:637-644.
Doermann et al., "Applying Algebraic and Differential Invariants for Logo Recognition," Machine Vision and Applications 9:73-86, 1996.
Donato et al., "Classifying Facial Actions," IEEE Trans. on Pattern Analysis and Machine Intelligence, 21:974-989, 1999.
Dorai, C. et al., "Perceived Visual Motion Descriptors from MPEG-2 for content-based HDTV annotation and retrieval," IEEE $3^{rd}$ Workshop on Multimedia Signal Processing, 147-152.
Drucker et al., "SmartSkip: Consumer Level Browsing and Skipping of Digital Video Content," Paper: Technology to Help People Find Information, vol. No. 4, Issue No. 1, pp. 219-226, Minneapolis, Minnesota, USA, Apr. 20-25, 2002.
Erol, B. et al., "Local Motion Descriptors," IEEE Workshop on Multimedia Signal Processing, 467-472, 2001.
Essa et al., "Coding Analysis Interpretation and Recognition of Facial Expressions," IEEE Trans. on Pattern Analysis and Machine Intelligence, 19:757-763, 1997.
European Search Report, EP 05008745, Jun. 6, 2005, 4 pages.
"FaceIt Face Recognition Technology Frequently Asked Technical Questions," Visionics Corporation, 36 pages.
"Flexible JAMM Screenshots," downloaded from internet site http://simon.cs.ct.edu/-jamm May 4, 2000.
Foote, J. et al., "An Intelligent Media Browser Using Automatic Multimodal Analysis," ACM Multimedia '98, ACM Press, pp. 375-380, Bristol, UK, 1998.
Foote, J. et al., "Finding Presentations in Recorded Meeting Using Audio and Video Features." ICASPP, 3029-3032, 1999.
Foote, J. et al., "FlyCam: Practical Panoramic Video and Automatic Camera Control," Proceedings of International Conference on Multimedia & Expo, 3:1419-1422, 2000.
Furui et al., "Japanese Broadcast News Transaction and Information Extraction," Communications of the ACM, 43(2):71-73, Feb. 2000.
Gauvain et al., "Transcribing Broadcast News for Audio and Video Indexing," Communications of the ACM, 43:64-70, 2000.
Gibbon, David C., "Generating Hypermedia Documents from Transcriptions of Television Programs Using Parallel Text Alignment," Handbook of Internet and Multimedia Systems and Applications, CRC Press, 1998.
Glance, Natalie et al., "Knowledge Pump: Community-Centered Collaborative Filtering," Xerox Research Centre Europe, Grenoble Laboratory, Oct. 27, 1997, pp. 1-5.
Gliedman, J., "Virtual Office Managers," Computer Shopper, 18(9):290, 1998.

Gopal, S. et al., "Load Balancing in a Heterogeneous Computing Environment," Proceedings of the Thirty-First Hawaii International Conference on System Sciences, Jan. 6-9, 1998.

Gordon, "Using Annotated Video as in Information Retrieval Interface," ACM Proceedings of the 5th International Conference on Intelligent User Interfaces, New Orleans, pp. 133-140, 2000.

Grasso, A. et al., "Augmenting Recommender Systems By Embedding Interfaces Into Practices," Proceedings of the 33rd Hawaii International Conference on System Sciences 2000 IEEE, pp. 1-9.

Grasso, Antonietta et al., "Supporting Informal Communication Across Local and Distributed Communities," Xerox Research Centre Europe, Grenoble, France, 8 pages.

Greenberg, Saul, "A Fisheye Text Editor For Relaxed-WYSIWIS Groupware," ACM SIGCHI'96 Conference on Human Factors in Computing System, Companion Proceedings, 1996, pp. 212-213.

Greenberg, et al., "Sharing Fisheye Views in Relaxed-WYSIWIS Groupware Applications," Proceedings of Graphics Interface, Toronto, Canada, May 22-24, 1995, Distributed by Morgan-Kaufmann, pp. 28-38, http://www.cpsu.ucalgary.ca/grouplab/papers/1996/96-Fisheye.GI/gi96fisheye.html.

Gross, R. et al., "Face Recognition in a Meeting Room," IEEE International Conference on Automatic Face and Gesture Recognition, 294-299.

Gropp, W. et al., "Using MPI—Portable Programming with the Message-Passing Interface," copyright 1999, pp. 35-42, second edition, MIT Press.

Gross, R. et al., "Towards a Multimodal Meeting Record," Proceedings of International Conference on Multimedia and Expo, 1593-1596.

Hauptmann et al., "Story Segmentation and Detection of Commercials in Broadcast News Video," Advances in Digital Libraries Conference, Santa Barbara, CA Apr. 22-23, 1998.

Hauptmann et al., "Text, Speech and Vision for Video Segmentation: the Informedia Project," Proc. AAAI Fall Symp. Computational Models for Integrating Language and Vision, Boston, MA, Nov. 10-12, 1995.

He et al., "Comparing Presentation Summaries: Slides vs. Reading vs. Listening," Conference on Human Factors in Computing Systems (CHI 2000), Apr. 1-6, 2000.

Hearst et al., "TileBars: Visualization of Term Distribution Information in Full Text Information Access," Proceedings of the ACM SIGCHI Conference on Human Factors in Computing Systems (CHI), Denver, CO., pp. 1-8, May 1995, http://www.acm.org/sigchi/chi95/Electronic/documents/papers/mah_bdy.htm.

Hecht, "Embedded Data Glyph Technology for Hardcopy Digital Documents," Proc. SPIE 2171:341-352, 1994.

Hecht, "Printed Embedded Data Graphical User Interfaces," IEEE Computer, Mar. 2001.

Hill et al., "Edit Wear and Read Wear," Computer Graphics and Interactive Media Research Group, pp. 3-9, May 1992.

Hoadley, C., "A Very Short Introduction to UNIX," The Metropolitan State College of Denver/Information Technology Center for Technology Services, Apr. 30, 2002, pp. 1-18.

Hsu, R.L., et al., "Face Detection in Color Images," Proc. International Conference on Image Processing, 1046-1049, 2001.

Hu et al., "Multimedia Description Framework (MDF) for Content Descriptions of Audio/Video Documents," Fourth ACM Conference on Digital Libraries (DL '99), Aug. 11-14, 1999.

IBM Technical Disclosure Bulletin, "Quick Selection of Window Environment Coordinates," 35:57-60, ISS # 4B, 1992.

Ioffe et al., "Finding People by Sampling," Proc. International Conference on Computer Vision, pp. 1092-1097, 1999.

Jang et al., "Improving Acoustic Models With Captioned Multimedia Speech," IEEE, 1999, pp. 767-771.

Jin et al., "Topic Tracking for Radio, TV Broadcast, and Newswire," Proceedings of the DARPA Broadcast News Workshop, Feb. 28-Mar. 3, 1999, Herndon, VA.

Johnson, S.E., "Who Spoke When?—Automatic Segmentation and Clustering for Determining Speaker Turns," Proc. Of Eurospeech, 679-682, 1999.

Kapralos, B. et al., "Eyes 'n Ears Face Detection," 2001 International Conference on Image Processing, 1:65-69, 2001.

Khare, R., "Anatomy Of A URL (and Other Internet-Scale Namespaces, Part 1)," IEEE Internet Computing, Sep.-Oct. 1999, pp. 78-81.

Kimber, D. et al., "Acoustic Segmentation for Audio Browsers," Proc. Interface Conference, Sydney, Australia, 10 pages, 1996.

Komlodi et al., "Key Frame Preview Techniques for Video Browsing," Proceedings of the 3rd ACM International Conference on Digital Libraries, Jun. 23-26, 1998, Pittsburgh, pp. 118-125, 1998.

Lam et al., "Automatic Document Classification Based on Probabilistic Reasoning: Model and Performance Analysis," IEEE, 3:2719-2723, 1997.

Langley, P., "An Analysis of Bayesian Classifiers," Proceedings of 10th National Conference on Artificial Intelligence, pp. 223-228, 1992.

Langley, P., "Induction of Selective Bayesian Classifiers," Proceedings of 10th National Conference on Uncertainty in Artificial Intelligence, pp. 400-406, 1994.

Lee, D. et al., "Segmenting People in Meeting Videos Using Mixture Background and Object Models," Proc. Of Pacific Rim Conference on Multimedia, Taiwan, Dec. 16-18, 8 pages, 2002.

Li et al., "Automatic Text Detection and Tracking in Digital Video," IEEE Transactions on Image Processing—Special Issue on Image and Video Processing for Digital Libraries, 9:147-156, 2000.

Li et al., "Text Extraction and Recognition in Digital Video," Proceedings of Third IAPR Workshop on Document Analysis Systems, pp. 119-128, 1998.

Li et al., "Text Extraction, Enhancement and OCR in Digital Video," DAS '98, LNCS 1655, pp. 363-377, Springer-Verlag Berlin Heidelberg 1999.

Li et al., "VISION: A Digital Video Library," Proceedings of the 1st ACM International Conference on Digital Libraries, pp. 19-27, 1996.

Liang et al., "Practical Video Indexing and Retrieval System," SPIE 3240:294-303, 1988.

Lienhart et al., "On the Detection and Recognition of Television Commercials," Proc. IEEE Conf. On Multimedia Computing and Systems, Ottawa, Canada, pp. 509-516, Jun. 1997.

Ma et al., "An Indexing and Browsing System for Home Video," Invited paper, EUSIPCO '2000, 10th European Signal Processing Conference, Sep. 5-8, 2000, Tampere, Finland.

Manber, U., "The Use of Customized Emphasis in Text Visualization," Proceedings of 1997 IEEE Conf. On Information Visualization, pp. 132-138, Aug. 27-29, 1997, London, England.

Maybury, "News on Demand," Communications of the ACM, 43:33-34, 2000.

Maybury et al., "Multimedia Summaries of Broadcast News," International Conference on Intelligent Information Systems, 1997, pp. 442-449.

Maybury, M. et al., "Segmentation, Content Extraction and Visualization of Broadcast News Video Using Multistream Analysis," AAAI Paper, 1997.

Merialdo et al., "Automatic Construction of Personalized TV News Programs," Seventh ACM International Multimedia Conference, Orlando, Nov. 1999.

Merlino et al., "Broadcast News Navigation Using Story Segmentation," Advanced Information Systems Center, The MITRE Corporation, 1997.

Merlino et al., "Broadcast News Processing Techniques," MITRE Technical Report, MTR 99B0000031, Apr. 1999.

Mohan, "Text-Based Search of TV News Stories," Proc. SPIE 2916:2-13, 1996.

Myers, B.A. et al., "Multi-View Intelligent Editor for Digital Video Libraries," First ACM and IEEE Joint Conference on Digital Libraries, pp. 106-115, Jun. 24-28, 2001, Roanoke, VA.

Oh et al., "Efficient and Cost-Effective Techniques for Browsing and Indexing Large Video Databases," SIGMOD Conference 2000: 415-426.

Pfau, T. et al., "Multispeaker Speech Activity Detection for the ICSI Meeting Recorder," Proc. IEEE Automatic Speech Recognition and Understanding Workshop, 4 Pages, 2001.

Pingali, G. et al., "Multimedia Retrieval Through Spatio-Temporal Activity Maps," ACM Multimedia 129-136, 2001.

Rist, T. et al., "Adding Animated Presentation Agents to the Interface," ACM International Conference on Intelligent User Interfaces, pp. 79-86, 1997.

Rowley et al., "Neural Network-Based Face Detection," IEEE Transactions on Pattern Analysis and Machine Intelligence, 20:23-38, 1998.

Rui, Y. et al., "Viewing Meetings Captured by an Omni-Directional Camera," ACM SIGCHI '01, vol. 3, No. 1, pp. 450-457, Seattle, Mar. 31-Apr. 4, 2001.

Schweighofer et al., "The Automatic Generation of Hypertext Links in Legal Documents," Lecture Notes in Computer Science, vol. 1134, Wagner et al., eds., from 7th Int. Conf., DEXA '96, Sep. 1996, Zurich, Switzerland.

"Seiko Instruments USA, Inc.—Business and Home Office Products" online, date unknown, Seiko Instruments USA, Inc., [retrieved on Jan. 25, 2005]. Retrieved from the Internet: <URL: http://www.siibusinessproducts.com/products/link-ir-p-html>.

Shahraray et al., "Automatic Generation of Pictorial Transcripts of Video Programs," Proceedings of the SPIE—Int. Soc. Opt. Eng. 2417:512-518, 1995.

Shahraray et al., "Pictorial Transcripts: Multimedia Processing Applied to Digital Library Creation," 1997 IEEE First Workshop on Multimedia Signal Processing, pp. 581-586, 1997.

Shahraray et al., "Automated Authoring of Hypermedia Documents of Video Programs," ACM Multimedia 95, San Francisco, CA, Nov. 5-9, 1995.

Shen, H. et al. "Access Control For Collaborative Environments," CSCW 92 Proceedings, Nov. 1992, pp. 51-58.

Sloman, M., "Policy Driven Management For Distributed Systems," To be published in Journal of Network and Systems Management, Plenum Press, 1994, vol. 2, No. 4.

Smith et al., "Video Skimming and Characterization Through the Combination of Image and Language Understanding," Computer Vision and Pattern Recognition IEEE 1997.

Snowdon, Dave et al., "Diffusing Information in Organizational Settings: Learning from Experience," CHI 2002, vol. No. 4, Issue No. 1, Apr. 20-25, Minneapolis, Minnesota, pp. 331-338.

Sodergard et al., "Integrated Multimedia Publishing—Combining TV and Newspaper Content on Personal Channels," downloaded from http:www8.org/w8-papers/1b-multimedia/integrated/integrated.html on Apr. 4, 2002, pp. 1-22.

Sonmez et al., "Multiple Speaker Tracking and Detection: Handset Normalization and Duration Scoring," Digital Signal Processing 10:133-143, 2000.

Stauffer, C. et al., "Adaptive Background Mixture Models for Real-Time Tracking," Proceedings of Computer Vision and Pattern Recognition, 246-252.

Suda et al., "Logo and Word Matching Using a General Approach to Signal Registration," Fourth International Conference on Document Analysis and Recognition, Ulm, Germany, Aug. 18-20, 1997, 61-65.

Sumita et al., "Document Structure Extraction for Interactive Document Retrieval Systems," Proceedings of SIGDOC 93, pp. 301-310, Oct. 5-8, 1993, Kitchner, Ontario.

Sun, X. et al., "A Motion Activity Descriptor and its Extraction in Compressed Domain," Proc. IEEE Pacific-Rim Conference on Multimedia (PCM '01), 4 Pages, 2001.

Sun, X. et al., "Panoramic Video Capturing and Compressed Domain Virtual Camera Control," ACM Multimedia, pp. 329-338, 2001.

Taghva et al., "An Evaluation Of An Automatic Markup System," SPIE Proceedings, Feb. 6-7, 1995, pp. 317-327, vol. 2422.

Taghva et al., "Evaluation of an Automatic Markup System," Proceedings SPIE vol. 2422, Document Recognition II, p. 317-327, Mar. 1995.

"Tasty FotoArt" [online], date unknown, Tague Technologies, Inc., [retrieved on Mar. 8, 3005]. Retrieved from the Internet: <URL: http//www.tastyfotoart.com>.

Taxt, T., "Segmentation of Document Images," IEEE, 11(12):1322-1329 (1989).

Tennenhouse et al., "A Software-Oriented Approach to the Design of Media Processing Environments," Proceedings of the IEEE International Conference on Multimedia Computing and Systems, pp. 435-444, 1994.

Tonomura et al., "VideoMAP and VideoSpaceIcon: Tools for Anatomizing Video Content," Proc. INTERCHI '93, ACM, pp. 131-136, 1993.

Tritschler, A. et al., "Improved Speaker Segmentation and Segments Clustering Using the Bayesian Information Criterion," Proc. Of Eurospeech, pp. 679-682, 1999.

Uchihashi et al., "Summarizing Video Using a Shot Importance Measure and a Frame-Packing Algorithm," Proceedings of the International Conference on Acoustics, Speech, and Signal Processing, Phoenix, AZ, 6:3041-3044, 1999.

Uchihashi et al., "Video Manga: Generating Semantically Meaningful Video Summaries," ACM Multimedia 99, Orlando, Florida, Oct. 30-Nov. 5, 1989.

VideoLogger, Automate Video Acquisition And Production, Virage, Inc., [online] [Retrieved on Apr. 26, 2002] Retrieved from the Internet<URL:http://www.virage.com/products/details.cfm?productID=5&categoryID=1>.

"Video Mail Retrieval Using Voice" Cambridge University Engineering Department Computer Laboratory and Olivetti Research Laboratory summary of research found at http://svr-www.eng.cam.ac.uk/research/projects/vmr/ (1997).

Wactlar et al., "Complementary Video and Audio Analysis for Broadcast News Archives," Communications of the ACM, 43:42-47, 2000.

Wactler et al., "Intelligent Access to Digital Video: Informedia Project," Computer 29:46-52, 1996.

Waibel, A. et al., "Advances in Automatic Meeting Record Creation and Access," Proceedings of the International Conference on Acoustics, Speech, and Signal Processing, pp. 597-600, 2001.

Weiss et al., "Composition and Search with a Video Algebra," IEEE Multimedia 2:12-25, 1995.

Wilcox, L. et al., "Annotation and Segmentation for Multimedia Indexing and Retrieval," Proceedings of the Thirty-First annual Hawaii International Conference on System Sciences (Wailea, Hawaii), vol. II, pp. 259-267, Jan. 1998.

Wittenburg et al., Browsing with Dynamic Key Frame Collages in Web-Based Entertainment Video Services, In Proceedings of IEEE International Conference on Multimedia Computing and Systems, Jun. 7-11, 1999, Florence, Italy, 2:913-918, 1999.

Xerox, "Flowport, Effective Document Management," brochure, 2 pages.

Xerox, "Flowport, Paper that knows where it's going," Xerox Corporation, specification sheet, 1 page.

Xerox, "FlowPort Software, Solutions for the Legal Market from Xerox", 2001 Xerox Corporation, 2 pages.

Xerox, "FlowPort™ Xerox Image Routing Software FlowPort Overview," Xerox Corporation, 2003, 4 pages.

Yang, J. et al., "Multimodal People ID for a Multimedia Meeting Browser," Proceedings of ACM Multimedia, pp. 159-168, 1999.

Yang, M.H. et al., "Detecting Faces in Image: A Survey," IEEE Transactions on Pattern Analysis and Machine Intelligence, 24(1):34-58, 2002.

ZDnet, "Captured! Three document capture systems tested," ZDnet, Technology & Business, Nov. 28, 2002, [visited on Apr. 29, 2003] <http://www.zdnet.com.au/printfriendly?AT=2000023555-20270277-4>, 8 pages.

Zhang et al., "Detection of Text Captions in Compressed Domain Video," International Multimedia Conference Proceedings of the 2000 ACM Workshops on Multimedia 2000, Los Angeles, CA, pp. 201-204.

Configuring A Printer (NT), Oxford Computer Support [online] [Retrieved on Nov. 13, 2003] Retrieved from the Internet<URL: http://www.nox.ac.uk/cehoxford/ccs/facilities/printers/confignt.htm>.

"DocumentMall Secure Document Management" [online] [Retrieved on Mar. 9, 2004). Retrieved from the Internet <URL: http://www.documentmall.com>.

Girgensohn, Andreas et al., "Time-Constrained Keyframe Selection Technique," Multimedia Tools and Applications (2000), vol. 11, pp. 347-358.

Graham, Jamey et al., "A Paper-Based Interface for Video Browsing and Retrieval," IEEE International Conference on Multimedia and Expo (Jul. 6-9, 2003), vol. 2, P:II 749-752.

Graham, Jamey et al., "The Video Paper Multimedia Playback System," Proceedings of the 11th ACM International Conference on Multimedia (Nov. 2003), pp. 94-95.

Graham, Jamey et al., "Video Paper: A Paper-Based Interface for Skimming and Watching Video," International Conference on Consumer Electronics (Jun. 16-18, 2002), pp. 214-215.

Hull, Jonathan J. et al., "Visualizing Multimedia Content on Paper Documents: Components of Key Frame Selection for Video Paper," Proceedings of the 7th International Conference on Document Analysis and Recognition (2003), vol. 1, pp. 389-392.

"Kofax: Ascent Capture: Overview" [online] [Retrieved on Jan. 22, 2004]. Retrieved form the Internet: <URL http://www.kofax.com/products/ascent/capture>.

PostScript Language Document Structuring Conventions Specification, Version 3.0 (Sep. 25, 1992), Adobe Systems Incorporated.

Communication Pursuant to Article 96(2) EPC, European Application No. 04255836.1, Jun. 11, 2007, 10 pages.

Stifelman, L. et al., "The Audio Notebook," SIGCHI 2001, Mar. 31-Apr. 5, 2001, pp. 182-189, vol. 3, No. 1, Seattle WA.

Level 10

DVD NUMBER 45378 ~ 260

KEY F54jk890XC ~ 270

Level 9

Teleconference Meeting Between Mr. Sakurai and Mr. Sakai ~290

Date: 23 November, 2003 ~280

DVD Number 45378 ~260

Key: F54jk890XC ~270

MULTIMEDIA OUTPUT DEVICE HAVING EMBEDDED ENCRYPTION FUNCTIONALITY

CROSS REFERENCE TO RELATED APPLICATIONS

The present application claims priority under 35 U.S.C. §119(e) to the following provisional patent applications, each of which is incorporated by reference in its entirety: U.S. Provisional Application Ser. No. 60/506,303, filed Sep. 25, 2003, and titled "Printer Including One or More Specialized Hardware Devices" and U.S. Provisional Application Ser. No. 60/506,302, filed Sep. 25, 2003, and titled "Printer Including Interface and Specialized Information Processing Capabilities."

This application is a continuation-in-part and claims priority from the U.S. patent application Ser. No. 10/639,282, titled "Physical Key For Accessing a Securely Stored Digital Document", filed Aug. 11, 2003, the disclosure of which is incorporated by reference.

BACKGROUND

1. Field of the Invention

This invention relates generally to multimedia output devices that have embedded encryption functionality, and in particular to methods and systems that encrypt content and provide electronic output and associated paper output that provides information about the decryption.

2. Background of the Invention

Frequently, users need to maintain security of electronic data. Data encryption is one of the most effective ways to achieve data security. To read an encrypted file, one needs to have access to a key or password that enables a user to decrypt the file. A one-time pad algorithm is a well-known encryption algorithm used by some very secure encryption systems. According to this technique, the decryption key is of the same length as the data that needs to be encrypted. As a result, this technique presents difficulties for users because they cannot remember long strings of random characters.

Alternative solutions to using the one-time pad algorithm are known. One solution requires users to provide their own passwords that are used to encrypt data. However, user-provided passwords are often vulnerable to password cracking techniques.

Another solution requires users to register with some authority, such as a public-key authority, to set up a public-private key pair used to encrypt and decrypt the data. However, most people do not have time to set up such keys.

To overcome the limitations of existing encryption techniques, it has been known to embed encryption functionality in computing devices. These computing devices are adapted to generate keys used to encrypt or decrypt data. To produce a paper output of the generated key, these devices need to send instructions to a printer or other output device. In addition, if a user desires to create multiple copies of the encrypted data, the computing device needs to be equipped with a plurality of removable media devices. Thus, if a user desires to have multiple copies of the encrypted data in the electronic format as well as a paper output of the generated key, a user needs to have at least a computing device having encryption functionality, a printer, and a device capable of writing encrypted data to multiple removable media devices.

Furthermore, existing computing devices that embed encryption functionality do not generate separate keys for each encrypted data. This is undesirable because it reduces the security of the system because multiple encrypted data would share the same key.

Accordingly, what is needed is a device that embeds the encryption functionality of the conventional computing device without the limitations of conventional techniques for outputting decryption information.

SUMMARY OF THE INVENTION

A multimedia output device having embedded encryption functionality enables the outputting of content in an encrypted form. The multimedia output device receives the content, encrypts the content, and provides an electronic output of the encrypted content. In certain embodiments, the multimedia output device also generates an associated paper output that provides information about the encryption, such as a decryption key, an identification of the electronic output of the encrypted content, and optionally a description of the content. The separation of the decryption key from the encrypted content provides security for the encrypted content since the key is stored separately from the encrypted content. If the encrypted content fell into unauthorized hands, an unintended recipient would not have the key to decrypt the content.

In one embodiment, a multimedia output device includes an interface for receiving content, such as audio or video content, and a content processing system coupled to the interface to receive the content. The content processing system, in turn, includes an encryption module that performs the encryption functionality. In one embodiment, the encryption module generates a key and encrypts the content using the generated key. In another embodiment, the encryption module encrypts the received content using a key provided by the user. The encryption module executes a key and metadata generation module, which is adapted to receive unencrypted content and to generate various levels of description of the content in response to a user's selection of a security level. Such a description includes keywords, key frames from a video, or just a title. Thus, a low security level would result in a description containing meaningful keywords or key frames while a high security level would result in a printed description that revealed less about the content. In one embodiment, the key and metadata module is further adapted to generate decryption information, which includes a generated key, an identifier of the electronic output of the encrypted content, and description of the encrypted content.

The multimedia output device also includes an electronic output system adapted to receive the encrypted content and produce a corresponding electronic output. The multimedia output device also includes a printing output system in communication with the processing system. The printing output system receives decryption information from the key and metadata module and generates an associated paper output that provides information about the decryption.

The multimedia output device also includes a user interface that provides to a user a selection of the options in connection with data encryption. Such options include the type of encryption desired, the output format of the encrypted content, and the output format of the decryption information. Various encryption techniques include symmetric encryption, a public key encryption, and symmetric encryption with the key encrypted with a recipient's public key. The choices of the output format for the encrypted data and for decryption information include an electronic format and a paper format. Additionally, the user interface allows a user to choose the level of security at which decryption information will be provided.

Additional embodiments of the invention provide for encryption of audio and video data. To this end, the key and metadata module is adapted to perform various levels of processing of audio and video data, such as producing a transcript and extracting keywords from audio data, extracting key frames from video data and printing them on paper along with bar codes. A user is allowed to choose the level of security with which the decryption information should be printed. The encryption module, in turn, is adapted to encrypt audio and video data using various encryption algorithms for encrypting audio and video data.

Additional embodiments of the multimedia output device provide for receiving content, encrypt the content using a user's private key, and outputting the encrypted content that can be decrypted using a user's public key. This embodiment is beneficial because it provides the ability for a recipient to authenticate the content. The content can be both encrypted and signed, to provide security and authentication.

Additional embodiments of the invention provide for decryption of encrypted content. Multimedia output device is adapted to receive encrypted content and a key used to decrypt the content. Multimedia output device decrypts the content using well-known techniques and generates an electronic output of the decrypted content. In addition, the multimedia output device is adapted to process the decrypted content and to produce a summary, which is outputted on any medium selected by a user.

BRIEF DESCRIPTION OF THE DRAWINGS

FIG. 2B is an example of a paper output of decryption information in accordance with an embodiment of the invention.

FIG. 2C is an example of a paper output of decryption information in accordance with another embodiment of the invention.

DETAILED DESCRIPTION OF THE PREFERRED EMBODIMENTS

Various embodiments of a multimedia output device 120 having embedded encryption functionality enable the outputting of content in an encrypted form. Certain embodiments also output an associated paper output that provides information about decryption, such as a decryption key, an identification of the electronic output of the encrypted content, and description of the content encrypted. Depending on the desired application for the multimedia output device 120, the multimedia output device 120 includes any number of devices for receiving the content, outputting the paper output, and producing the electronic output.

Overall System Architecture

Figure 1A:
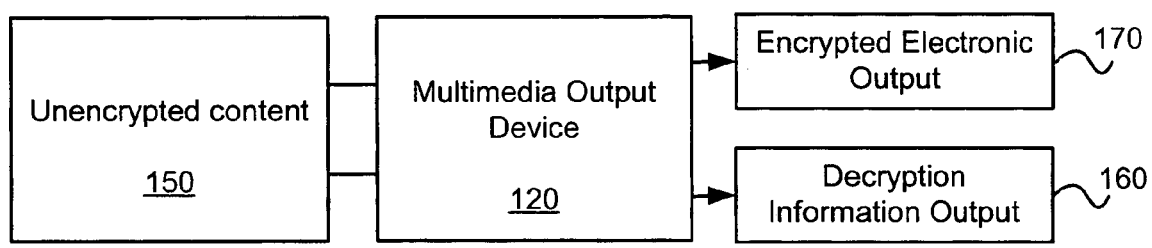
FIG. 1A is a schematic diagram of a system in accordance with an embodiment of the invention.

FIG. 1A is a high-level diagram of one embodiment of a system 100 in accordance with the present invention. System 100 includes a multimedia output device 120 capable of receiving content 150 to be encrypted and providing an electronic output 170 of the encrypted content and an associated output 160 that provides information about decryption. In some embodiments, output 160 is printed on paper. In other embodiments, output 160 is written to a digital medium. In still other embodiments, output 160 is displayed on a display screen. In an alternative embodiment, device 120 is adapted to output encrypted content and information about decryption serially onto a single output medium. For example, device 120 outputs encrypted content onto a digital medium and then outputs decryption information onto the same medium.

Content includes one or a combination of audio (including music, radio broadcasts, recordings, advertisements, etc.), video (including movies, video clips, television broadcasts, advertisements, etc.), software (including video games, multimedia programs, graphics software, etc.), pictures (including jpeg, jpeg2000, gif, tif, etc.) and documents (including Postscript, PCL, pdf, Word, etc.). This listing, however, is not exhaustive. Content may be encoded in any format or encoding technology, including Moving Pictures Experts Group (MPEG-2) format for video and MPEG-3 (mp3) for audio.

Multimedia output device 120 receives unencrypted content 150, encrypts the received content, and produces an electronic output of the encrypted content in any desired format. Multimedia output device 120 also outputs output 160 providing information about decryption of the content.

Multimedia output device 120 receives unencrypted content 150 from various sources, as will be discussed in greater detail in reference to FIG. 3. The multimedia output device 120 uses a variety of encryption algorithms to encrypt content 150, such as triple Data Encryption Standard (DES) algorithm, symmetric key encryption, one time path, public key encryption, encryption using symmetric key with further encryption of the symmetric key with a user's public key, and encryption using symmetric key with further encryption of the symmetric key using the recipient's public key.

The multimedia output device 120 writes the electronic output 170 of the encrypted content to a media device, such as a writeable DVD or CD, a video cassette tape, an audio cassette tape, a flash card, a computer disk, an SD disk, a memory stick, or any other appropriate electronically-readable medium. The encrypted data can be transmitted over a network, written to a memory device via USB or IEEE 1394. The encrypted content can also be printed to paper.

The multimedia output device 120 also outputs an associated output 160 that provides information about the decryption, such as the key "F54jk890XC" 270, an identification of the electronic output of the encrypted content, such as "DVD number 45378" 260 (as shown in FIG. 2B). The decryption information optionally includes a description of the content. This information will be used by the intended recipient of the encrypted content to decrypt the data. As used herein, the word "key" means a password, data, or a table used to decrypt encrypted data. In alternative embodiments, the decryption information is provided in an electronic format separately from the encrypted content.

The separation of the key from the encrypted content provides security for the encrypted content since the paper or any other medium containing the key is stored separately from the encrypted content. If the encrypted content fell into unauthorized hands, the unintended recipient would not have the key to decrypt the data. Accordingly, the loss of the output 160 that includes the decryption information does not affect the security of the electronic output 170 as long as both the output 160 and electronic output 170 do not fall into the unauthorized hands.

It should be noted that a user is allowed to provide a selection of the options in connection with data encryption. Such options include the type of encryption desired, the output format of the encrypted data, and the output format for the encryption data, as will be described in more detail below in reference to FIG. 2A.

The multimedia output device 120 preferably includes any necessary subsystem, as known by one skilled in the art, to print on a printable medium, such as a sheet of paper. Although outputting on paper is discussed above, it should be understood that a multimedia output device in accordance with various embodiments of the present invention could produce an image, words, bar codes, or other markings onto a variety of media, such as transparency sheets for overhead projectors, film, slides, canvas, glass, stickers, or any other medium that accepts such markings.

Depending on the intended application, multimedia output device 120 takes many different forms other than the typical office or home-use multimedia output device with which most people are familiar. Therefore, it should be understood that the definition of the multimedia output device 120 includes any device that is capable of producing an image, words, or any other markings on a surface.

Figure 1B:
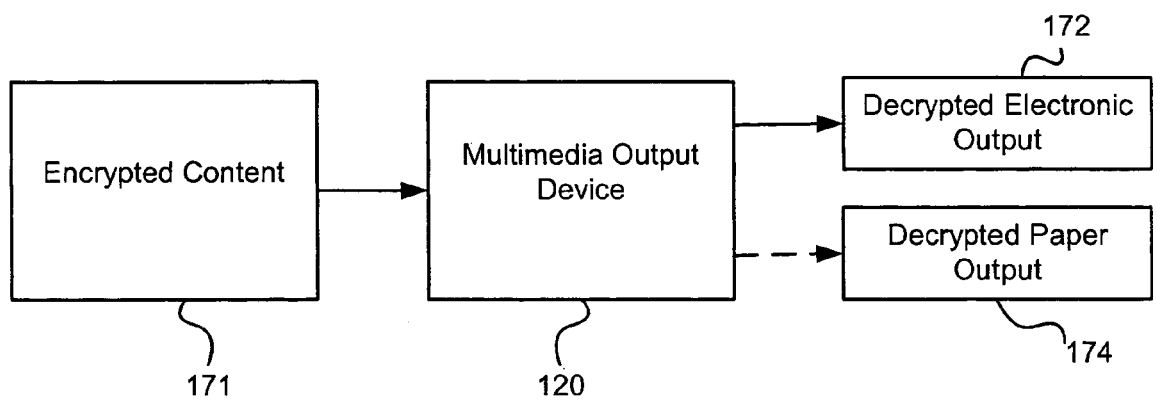
FIG. 1B is a schematic diagram of an embodiment of the system shown in FIG. 1A that performs decryption of encrypted content.

FIG. 1B is a high-level diagram of the system shown in FIG. 1A, in which multimedia output device 120 is adapted to receive encrypted content 171 and a key (not shown) used to decrypt the content 171 and to produce decrypted electronic output 172 and/or decrypted paper output 174. It should be noted that encrypted content 171 could be encrypted output 170 generated by device 120. Alternatively, encrypted content 171 is any encrypted content provided by a user. A key can be provided to device 120 via a keyboard, scanning a bar code, or using any known optical content recognition (OCR) technique with a key printed on paper or provided electronically by a driver software.

It should be noted that multimedia output device 120 is adapted to decrypt encrypted content 171 using any well-known decryption technique. The multimedia output device 120 is adapted to perform further processing of the decrypted content to produce a summary of the content. Such a summary could be outputted onto any medium specified by a user.

User Interface

Figure 2A:
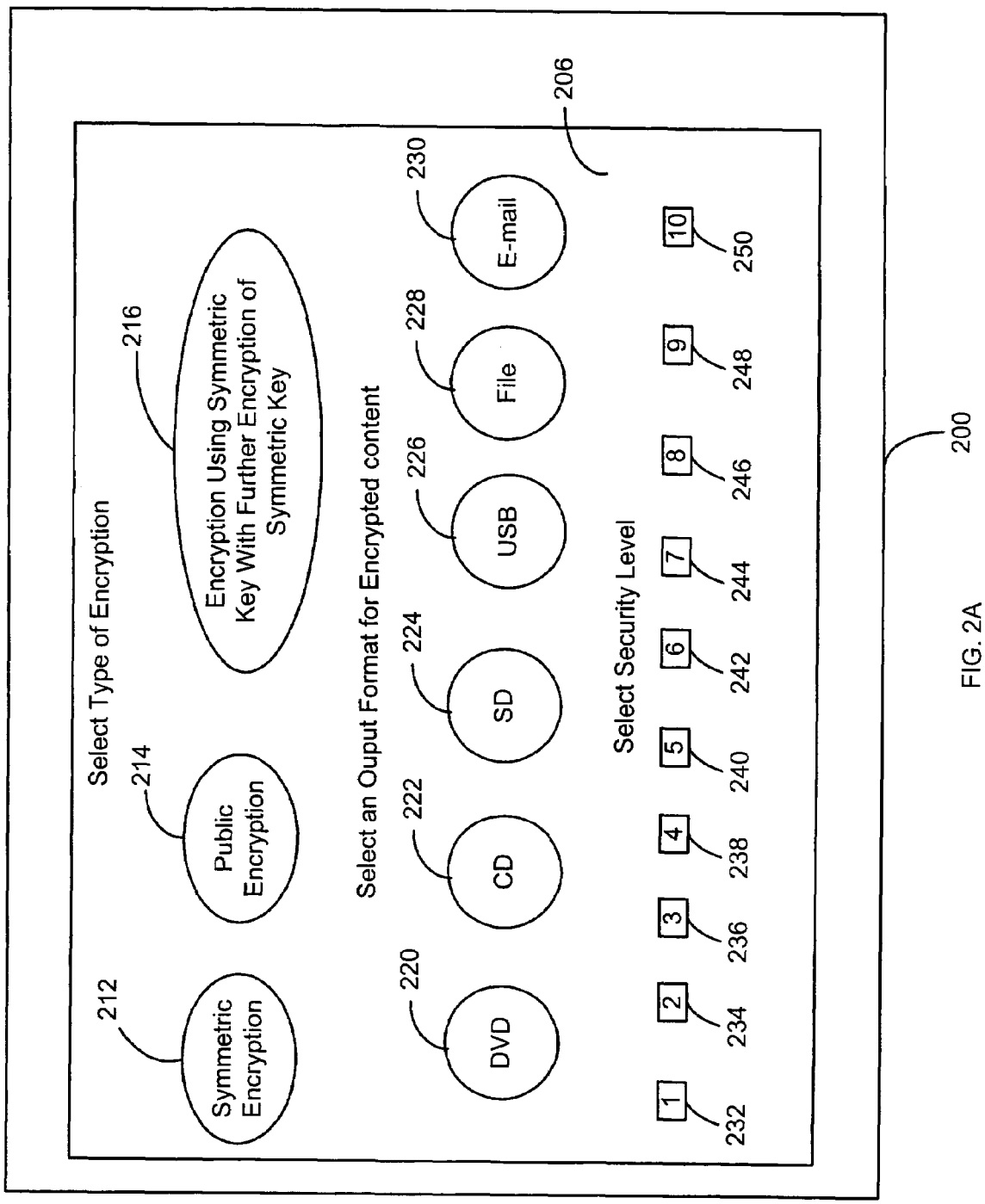
FIG. 2A is a user interface for selecting an electronic format and security level of a paper output in accordance with an embodiment of the invention.

FIG. 2A illustrates an exemplary user interface (UI) 200 for selecting various options in connection with encryption functionality embedded into multimedia output device 120. For example, a user is allowed to choose the type of encryption desired, the output format of the encrypted data, the output format for the decryption information, and a desired security level at which information about the decryption should be outputted.

The UI 200 is preferably displayed on a screen on which information is conveyed to the user. UI 200 preferably also includes a mechanism for allowing a user to input responses and make selections. In one embodiment, the UI 200 includes a touch screen 206, which allows the user to make selections and inputs by touching an appropriate part of the screen. In one embodiment, a keypad is also provided for entry of alphanumeric data. In an alternative embodiment, a joystick, trackball or other input device is used to provide input and make selections. It should be noted that in alternative embodiments, the user's input is provided via a multimedia output device driver dialog box on any client device or via a web page that sends data to multimedia output device 120 via secure HTTP or some other network protocol. As used herein, the "client device" is any wired or wireless device, including, but not limited to PDAs, cell phones, and stand alone computer systems.

As shown in FIG. 2A, UI 200 presents a user with a choice of the type of encryption desired. Such choices include symmetric encryption 212, public key encryption 214, and encryption using symmetric key with further encryption of the symmetric key using a recipient's public key 216. It should be noted that a recipient could be a user or any other intended recipient. These methods will be described in greater detail below. Screen 206 of UI 200 includes an instruction to the user to "select type of encryption." If a user selects the public key encryption method or symmetric encryption method with symmetric key encrypted with a recipient's public key, the user is provided with an option of entering his public key or the intended recipient's public key. Optionally, a user is allowed to choose the length of the key that will be used to decrypt the encrypted content. In addition, a user is allowed to edit the content before it is encrypted.

The UI 200 also allows a user to choose an output format for the encrypted content. Such choices include, for example, providing the encrypted content in an electronic format or in a paper format. As discussed above, the choices of the electronic formats presented to a user include, but are not limited to, removable storage devices, such as a writeable DVD or CD, a video cassette tape, an audio cassette tape, a computer disk, a SD disk, a USB drive, or any other appropriate electronically-readable medium. In the illustrated embodiment, the user selects from DVD 220, CD 222, SD 224, USB 226, File 228, and email 230. These options are shown by way of an example only. Those skilled in the art will appreciate that the present invention may be applied to any other output format that exists or may exist in the future.

The UI 200 optionally allows a user to select an output format for the decryption information (not shown). Such choices include providing the decryption information in an electronic format or in a paper format. The choices of the electronic formats presented to a user include, but are not limited to, removable storage devices, such as a writeable DVD or CD, a video cassette tape, an audio cassette tape, a computer disk, an SD disk, a USB drive, or any other appropriate electronically-readable medium.

In addition, the UI 200 allows the user to select a desired security level at which information about the decryption should be outputted. The embodiment of FIG. 2A shows ten security settings for selecting a paper security level. Ten security settings (1-10) are referenced by legend numbers 232-250 respectively. UI 200 includes several selections for the user to choose from. In the illustrated embodiment, a user is allowed to select a desired security level by checking an appropriate box. It should be noted that a user's choice of the level of security is based on the user's desire to trade off security and utility of the paper output. In one implementation, when the user selects the most secure (level 10), the generated output 160 identifies only the electronic output 170 of the encrypted data and the key that decrypts the content. When the user selects a less secure paper representation of decryption information, such as level 9, the output 160 includes, for example, a short description of the encrypted content, such as the date and title of the content.

FIG. 2B, illustrates an example paper output 160a of decryption information in accordance with one embodiment. In the illustrated embodiment, the paper output 160a is shown in response to a user selection of the security level 10 and "DVD" as an electronic format for the encrypted content. The paper output 160a provides minimum required information to decrypt the encrypted content 150. Output 160a, for example, provides an identifier 260 of the electronic output of the encrypted content, such as "DVD number 45378" and the key 270 that decrypts the content, such as "F54jk890XC."

FIG. 2C, illustrates an example paper output 160b of decryption information in response to a user selection of the security level 9 and "DVD" as an electronic format for the encrypted content. In the illustrated embodiment, the paper output 160b provides a less secure paper representation of encrypted information than the one shown in FIG. 2B. Such a printout additionally includes information, such as the date 280 and title 290 of the content. Although this description is less secure, it has more utility because it describes the encrypted content with greater particularity.

Figure 2D:
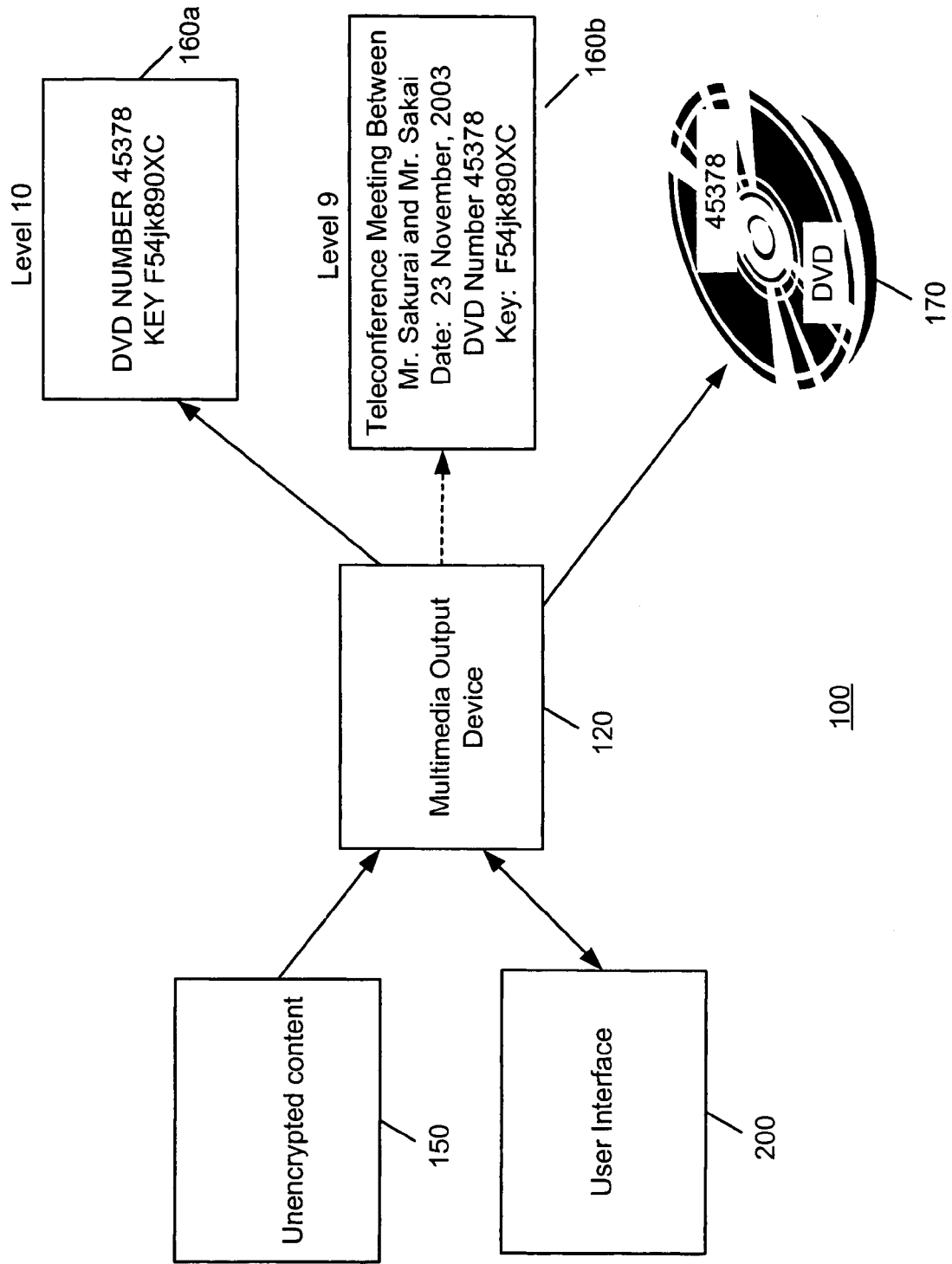
FIG. 2D is an embodiment of system 100 in which decryption information is provided in a paper format.

FIG. 2D is an embodiment of system 100 in which decryption information is provided in the form of a paper output. FIG. 2D shows two paper outputs 160a and 160b of FIGS. 2B and 2C. Output 160a provides decryption information in response to a user choosing the most secure level of security (level 10) of outputting decryption information. Output 160b provides decryption information in response to a user choosing a less secure level (level 9). As shown in FIG. 2D, encrypted content is provided in the electronic format, such as a writeable DVD 170.

Figure 2E:
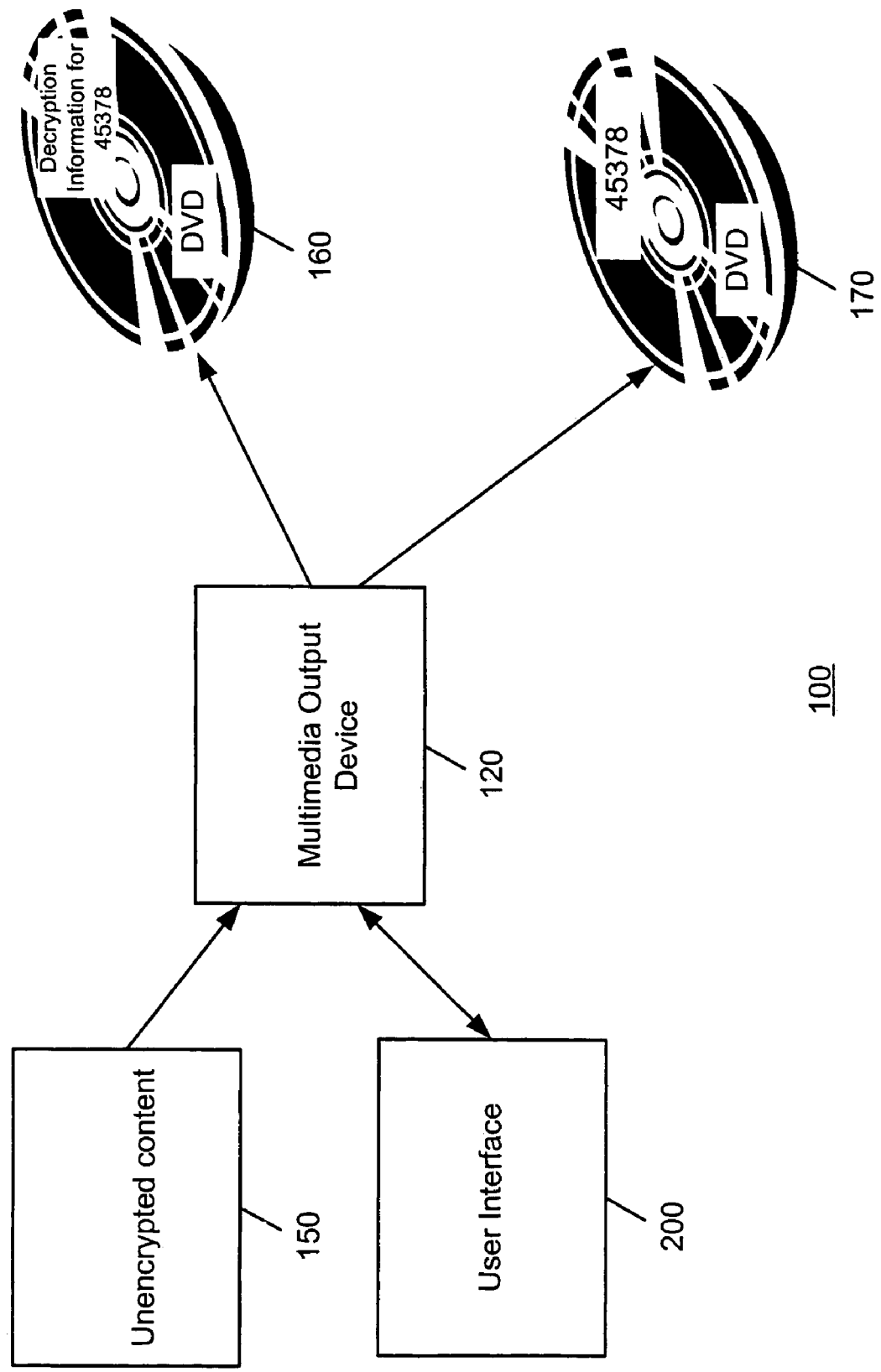
FIG. 2E is an embodiment of system 100 in which decryption information is provided in an electronic format.

FIG. 2E shows an alternative embodiment of system 100. In this embodiment, decryption information is stored in the electronic format, such as on a writeable DVD 160. When a one-time pad algorithm is used to encrypt content, the key used to decrypt the content has a long string of characters. Accordingly, outputting decryption information in the electronic format beneficially allows a user to store the long string of characters of the decryption key. In alternative embodiments, decryption information could be outputted on any type of non-volatile storage medium. The decryption information can also be emailed to a user or could be displayed on a UI 200.

Architecture of Multimedia Output Device

Figure 3:
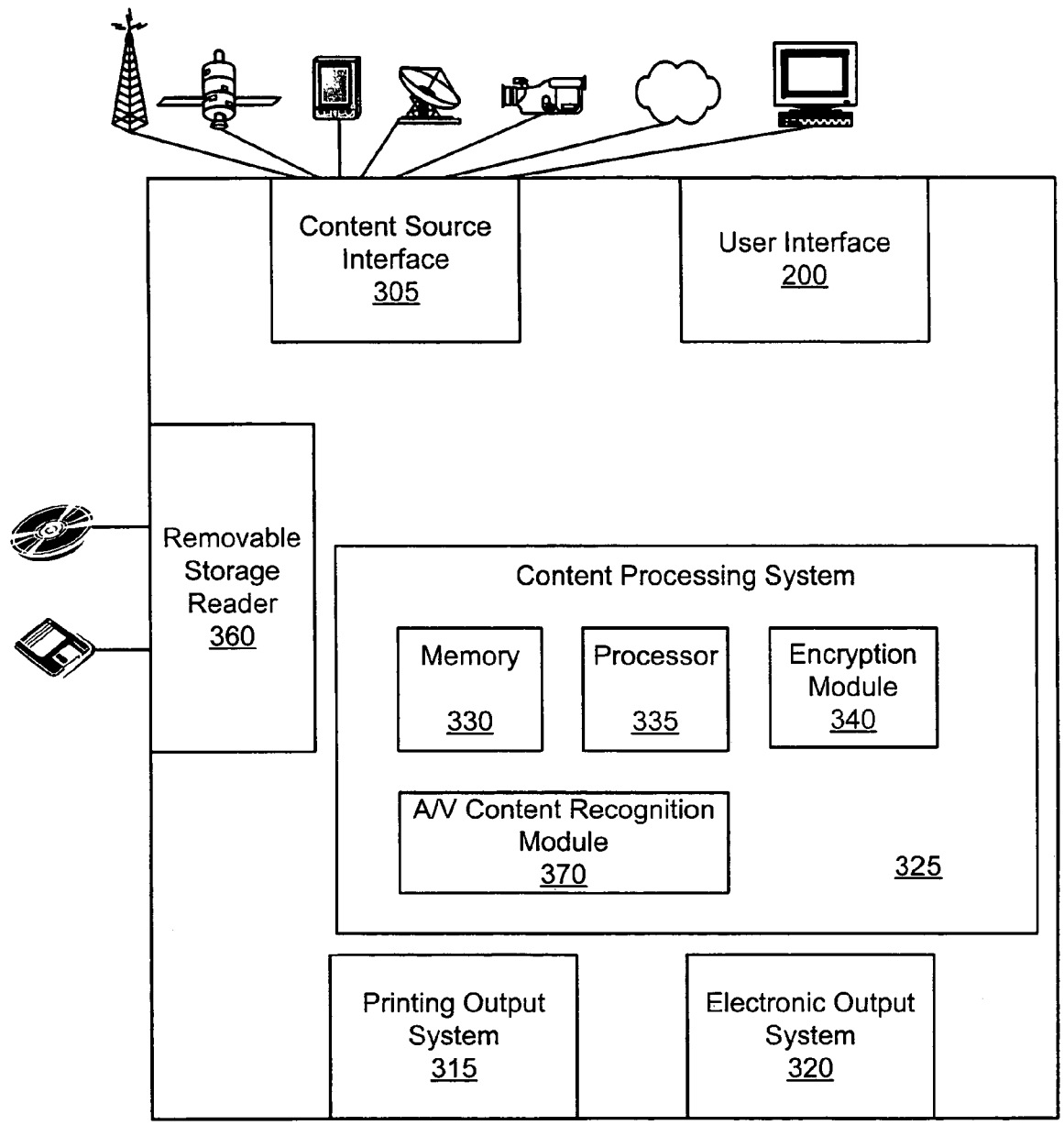
FIG. 3 is a schematic diagram of various processing systems of the multimedia output device in accordance with embodiments of the present invention.

FIG. 3 is a block diagram of one embodiment of multimedia output device 120. Multimedia output device 120 includes a source interface 305, a user interface 200, a printing output system 315, an electronic output system 320, and a content processing system 325. Capable of receiving content 150, the source interface 305 takes a variety of forms and includes one or more devices that receive content or create content by observing a content event. Similarly, the printing output system 315 and the electronic output system 120 take a variety of forms and each includes one or more devices that produce, respectively, an output 160 (printed or electronic) and an electronic output 170. Various components of multimedia output device 120 are further described in co-pending U.S. patent application entitled, "Printer Having Embedded Functionality for Printing Time-Based Media," to Hart et. al., filed Mar. 30, 2004, Ser. No. 10/814,931, which application is incorporated by reference in its entirety.

The user interface 200 has been described above in reference to FIG. 2A. The user interface 200 includes a display system, software for communicating with an attached display, or any number of embodiments described in co-pending U.S. patent application entitled, "Printer User Interface," to Hart et. al., filed Mar. 30, 2004, Ser. No. 10/814,700, which application is incorporated by reference in its entirety. The content processing system 325 is coupled to the source interface 305 and the user interface 200. The content processing system 325 is also coupled to the printing output system 315 and to the electronic output system 320 for providing the appropriate commands and data to those systems.

The content processing system 325 includes a processor 335 and a memory 330. Content processing system 325 also includes an encryption module 340. The encryption module 340 is adapted to receive content from various sources and to encrypt the received content. The encryption module 340 includes software, hardware, or a combination thereof for implementing an encryption functionality of multimedia output device 120.

The electronic output system 320 receives the encrypted content and generates an electronic output of the encrypted content, as described above in reference to FIG. 1A. In one embodiment, multimedia output device 120 writes the electronic output to a media device with a media writer (not shown). The media devices includes, for example, a removable storage devices such as a writeable DVD or CD, a video cassette tape, an audio cassette tape, a flash card, a computer disk, an SD disk, a memory stick, or any other appropriate electronically-readable medium. The media writer is further adapted to attach a unique identification of the encrypted content to a removable storage device that stores the encrypted content. Such identification, for example, includes a combination of alphanumeric characters.

The printing output system 315 produces an associated printed output of the decryption information. Such printed information includes, for example, a decryption key, an identification of the electronic output of the encrypted content, and optionally a description of the contents encrypted. The printing output system 315 comprises any standard printing hardware, including the one that is found in standard laser multimedia output devices, inkjet multimedia output devices, thermal wax transfer printers, dot matrix printers, and other printers as are known in the art.

Multimedia output device 120 includes an embedded Audio/Video (A/V) content recognition module 370 that performs one or more of video event detection, video foreground/background segmentation, face detection, face image matching, face recognition, face cataloging, video text localization, video optical character recognition (OCR), language translation, frame classification, clip classification, image stitching, audio reformatting, speech recognition, audio event detection, audio waveform matching, caption alignment, audio-caption alignment, and any other type of content recognition algorithms.

Multimedia output device 120 also includes a control module (not shown) that allows a user to edit the input content before it is encrypted. It should be noted that the control module is adapted to reside on the device associated with a user or on some other external device.

Various embodiments of multimedia output device 120 having audio/video content recognition are described in a co-pending U.S. patent application entitled, "Printing System With Embedded Audio/Video Content Recognition and Processing," to Hull et. al., filed Mar. 30, 2004, Ser. No. 10/813,950, which application is incorporated by reference in its entirety.

Content Source Interface

FIG. 3 further illustrates some examples of external sources from which multimedia output device 120 receives content 150. Depending on the desired input, the interface 305 allows the multimedia output device 120 to communicate with a wide variety of different electronic devices that can provide the multimedia output device 120 with content to print. Without intending to limit the types of devices, the interface 305 allows the multimedia output device 120 to receive content from external sources such as computer systems, computer networks, digital cameras, video cameras, media renderers (such as DVD and CD players), media receivers (such as televisions, satellite receivers, set-top boxes, radios, and the like), external storage devices, video game systems, or any combination thereof. The connection type for the interface 305 takes a variety of forms based on the type of device that is intended to be connected to the multimedia output device 120 and the available standard connections for that type of device. For example, the interface 305 comprises a port for connecting the device using a connection type such as USB, serial, FireWire, SCSI, IDE, RJ11, optical, composite video, component video, or S-video, or any other suitable connection type. The interface 305 can be a wireless interface that allows the multimedia output device 120 to receive content from a wireless device external to the multimedia output device 120. The interface 305 can allow the multimedia output device 120 to communicate with any number of wireless communication systems, such as wireless components on a home or business network, cellular phones and other portable wireless devices, satellites, satellite dishes, and devices using radio transmissions. Depending on the types of external devices with which the multimedia output device 120 is desired to communicate, the interface 305 comprises hardware and/or software that implements a wireless communications protocol, such as that described in IEEE 802.11 or the Bluetooth standard.

In another embodiment, the multimedia output device 120 receives content from a removable media storage reader 360 that is built into the multimedia output device 120. The removable media storage reader 360 is configured to accommodate any type of removable media storage device, such as DVDs, CDs, video cassette tapes, audio cassette tapes, floppy disks, ZIP disks, flash cards, micro-drives, memory sticks, SD disks, scanners, pdf machines, or any other suitable type of media storage devices. Moreover, the multimedia output device 120 is configured to include a plurality of removable media storage readers 360 to accommodate multiple types of media storage devices.

In another embodiment, the multimedia output device 120 includes an embedded video recorder (not shown in FIG. 3). In this embodiment, the external source of content is a series of images captured by the embedded video recorder. The video recorder, such as a camera, CCD, or other suitable mechanism for capturing a sequence of images, converts a scene into a suitable electrical format, such as that described in the MPEG, H.263, or H.264 standards.

In another embodiment, the multimedia output device 120 includes an embedded audio recorder (not shown in FIG. 3). In this embodiment, the external source of content is a series of sounds that are converted into a digital format by the embedded audio recorder. The audio recorder converts the recorded sound signal into a suitable electrical format, such as MPEG-2.

In another embodiment, the multimedia output device includes video capture hardware (not shown). In one embodiment, the video capture hardware is designed to be coupled to a computing system by a video cable thereof. The video cable from a display is attached to the multimedia output device 120, where the video signal is split with one signal directed to the computing system and another signal to the video capture hardware. The video capture hardware performs a differencing between successive frames of the video signal and saves frames with a difference that exceeds a threshold on a secondary storage in the multimedia output device 120. This offloads such processing from the computing system, thereby improving responsiveness and user experience and providing an easily browseable record of a user's activities during the day.

Various components of multimedia output device 120 and various content sources are further described in co-pending U.S. patent applications, each of which is incorporated by reference in its entirety: U.S. patent application entitled, "Printer Having Embedded Functionality for Printing Time-Based Media," to Hart et. al, filed Mar. 30, 2004, Ser. No. 10/814,931, and U.S. patent application entitled, "Networked Printing System Having Embedded Functionality for Printing Time-Based Media," to Hart et. al, filed Mar. 30, 2004, Ser. No. 10/814,948.

Methods of Operation

Figure 4A:
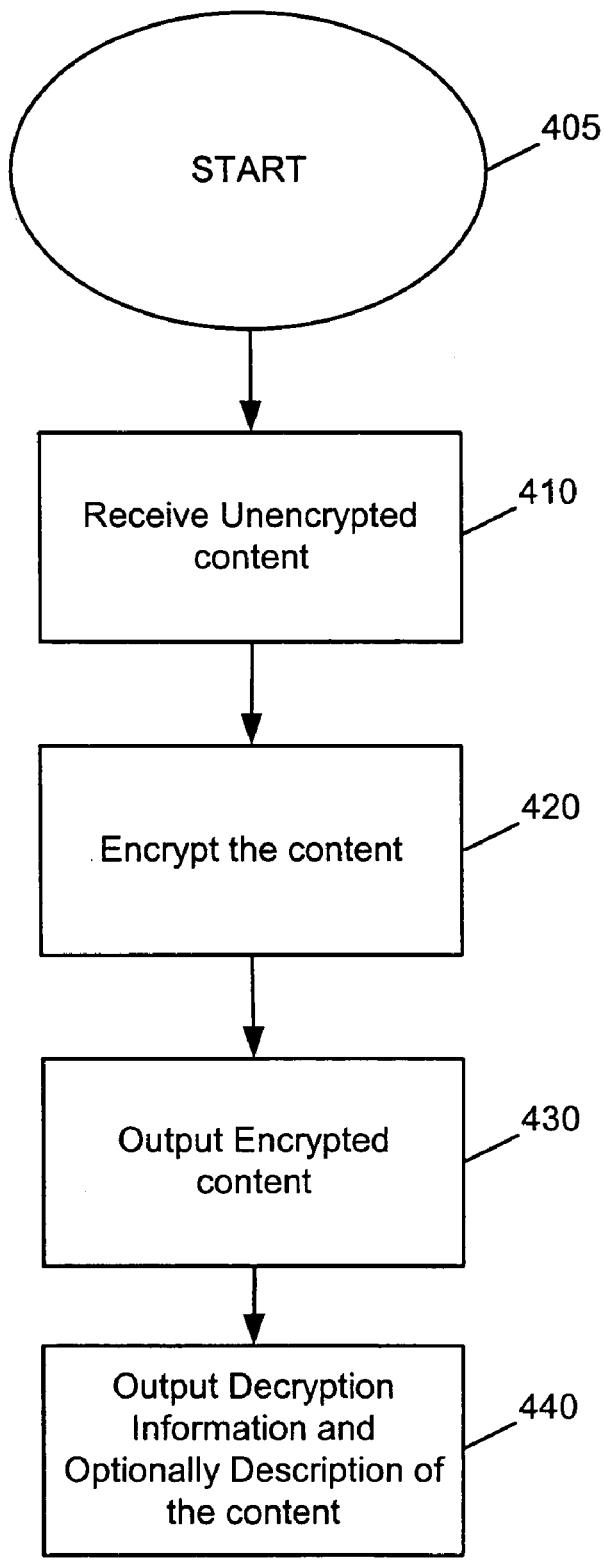
FIG. 4A is a flow diagram of the process performed by the multimedia output device in accordance with one embodiment of the present invention.

FIG. 4A is an overview of a generalized process by which the multimedia output device 120 creates an encrypted representation of the content and paper representation of decryption information in accordance with one embodiment of the present invention. It should be noted that methods related to various types of encryption techniques utilized by multimedia output device 120 are described in more detail below in reference to FIGS. 6-8.

The process starts 405 and the multimedia output device 120 receives 410 content from an external source. This content is received as digital or analog content, or it may be an observable event that interface 305 records as digital or analog data. Encryption module 340 encrypts the received content 420 according to, for example, a known encryption algorithm. Multimedia output device 120 provides 430 an output of the encrypted content. As described above, the encrypted content is outputted in an electronic format or in a paper format, as desired by a user. Multimedia output device 120 also provides 440 an output of the decryption information, such as a decryption key, identification of the electronic output of the encrypted content, and optionally contents. It should be noted that in an alternative implementation, the decryption key is outputted as a bar code. The decryption information is outputted on a paper or in an electronic format.

Figure 4B:
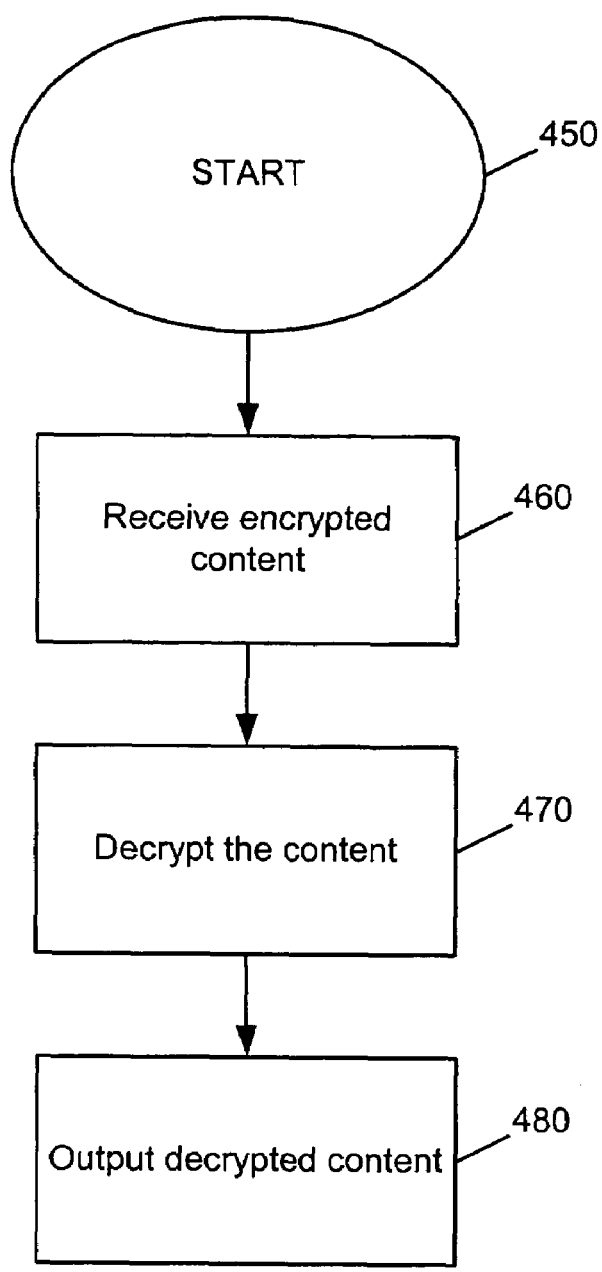
FIG. 4B is a flow diagram of the process performed by the multimedia output device in accordance with another embodiment of the present invention.

FIG. 4B is a flow diagram of a generalized process by which the multimedia output device 120 generates a decrypted representation of the content in accordance with one embodiment of the present invention.

The process starts 450 and the multi-media output device 120 receives 460 encrypted content. It should be noted that the encrypted content can be encrypted output 170 generated by multimedia device 120. Alternatively, encrypted content can be any content provided by a user that has been encrypted by other means than device 120. The multimedia output device 120 receives a key used to decrypt the encrypted content. As previously described, the key can be provided using various techniques, such as via a keyboard, or scanning a bar code, or using OCR with a key printed on paper, or alternatively, the key provided electronically.

Encryption module 340 decrypts 470 the content according to, for example, a known decryption algorithm. Multimedia output device 120 provides 480 an output of the decrypted content. The decrypted content is outputted, for example, in an electronic format, or a network interface, or in a paper format, as desired by a user.

Encryption Module Architecture

Figure 5:
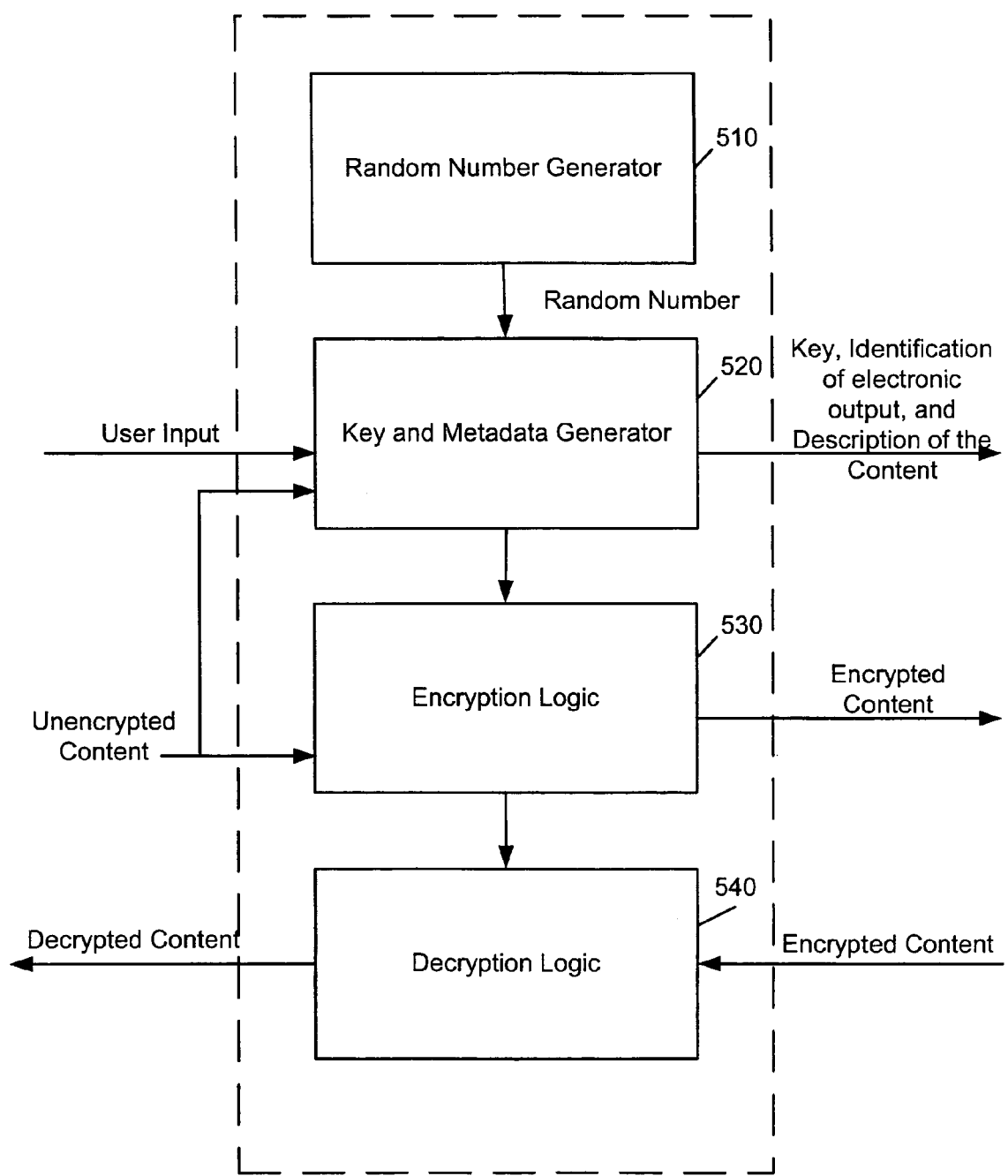
FIG. 5 is a block diagram of functional modules of encryption module in accordance with one embodiment of the present invention.

FIG. 5 is a block diagram of functional modules of encryption module 340 in accordance with one embodiment of the invention. The encryption module 340 executes a random number generator module 510, a key and metadata generator module 520, a module 530 for executing encryption logic, and a module 540 for executing decryption logic. As used herein, the term "module" refers to program logic for providing the specified functionality that can be implemented in hardware, firmware, and/or software. In one embodiment, a software module is implemented with a computer program product comprising a computer-readable medium containing computer program code, which can be executed by a computer processor for performing the steps, operations, or processes described herein.

The random number generation module 510 is adapted to generate a random number and send the generated random number to the key and metadata generation module 520. Module 510 is a pseudo random number generator running on a microprocessor or a digital signal processor (DSP) designed for performing the logic involved in digital signal processing. Module 510 is also adapted to generate a noise signal in order to provide a random number.

Module 520 is adapted to receive the random number generated by module 510. Module 520 generates a key using the provided random number and forwards the generated key to module 530. In one embodiment, when a public key encryption is utilized (as will be discussed below in reference to FIG. 7A), module 520 does not generate a key since a user knows his private key that will be used to decrypt the content.

Module 520 is also adapted to generate multiple keys for different parts of the content to be encrypted. Module 520 generates a unique identification that will identify the electronic output of the encrypted data. This identification will be used by the electronic output system 320 to attach the identification to a removable storage device that stores the encrypted content.

Module 520 is further adapted to receive a user selection of the security level with which decryption information should be provided. Module 520 is further adapted to receive unencrypted content and to perform an action in response to the received content and a user selection. Module 520 maintains rules indicating what action needs to be taken in response the user input and received content. Examples of these rules are shown below in Table 1. In one embodiment, performing an action includes generating decryption information. Decryption information includes, for example, a key, an identification of the electronic output of the encrypted content, and description of the received content. Module 520 uses well-known data extraction algorithms to generate various descriptions of the content in response to a user's desired choice of the security level. Module 520 outputs the decryption information to the printing output system 315 or electronic output system 320 depending on the user's choice of the medium onto which decryption information should be provided. It should be noted that when a public key encryption method is utilized, generated decryption information does not include a key since the key is provided by a user.

Example rules maintained by module 520 are shown below in Table 1.

TABLE 1

Rules for Generating Decryption information

| Security Level | Action |
|---|---|
| 1 | Generate transcript of the content<br>Generate decryption information which includes:<br>generated key,<br>identification of the electronic output of the encrypted content;<br>transcript of the content |
| ... | ... |
| 7 | Extract keywords from the content<br>Generate decryption information which includes:<br>generated key,<br>identification of the electronic output of the encrypted content, and<br>keywords |
| 8 | Extract key video frames;<br>Generate decryption information which includes:<br>Generated key,<br>identification of the electronic output of the encrypted content, and<br>Key video frames |
| 9 | Extract title and date of the encrypted content,<br>Generate decryption information which includes:<br>Generated key<br>identification of the electronic output of the encrypted content, and<br>Title and date of the encrypted content |
| 10 | Generate decryption information which includes:<br>Generated key, and<br>Identification of the electronic output of the encrypted content |

A rule may be constructed such as:

IF (Security level (10))

THEN GENERATE IDENTIFICATION OF THE ELECTRONIC OUTPUT OF THE ENCRYPTED CONTENT AND KEY

Module 530 is adapted to receive the key generated by module 520. Alternatively, module 530 is adapted to receive a key from the user. Module 530 receives the content and encrypts the content using the provided key. Module 530 is adapted to encrypt the content using any of the known encryption algorithms, such as DES, IDEA, Blowfish, RSA, Triple DES, RC2 and RC4. Module 530 executes program logic for providing the encryption functionality that can be implemented in hardware, firmware, and/or software. Hardware designs known to perform the encryption are available from, for example, Amphion Semiconductor Ltd, of Belfast, Northern Ireland. These designs are listed below.

- CS5210 performs AES encryption using 128,192, or 256 bit keys
- CS5020 performs DES and triple DES encryption/decryption
- CS5312 performs SHA-2 encryption with key sizes of 256,384, or 512 bits Hardware solutions, such as the one shown below, are also available, for example, from Eracom Technologies AG, of Krefeld, Germany:

- CSA8000 PKI-8PC/Server Encryption Adapter with RSA/DES in hardware

RSA (public key encryption) and Diffie-Hellman key generation algorithms are available in software development kits.

Software solutions to perform encryption are available from, for example, RSA Security Inc., of Bedford, Mass. These solutions are designed to run on DSP chips. For example, Snapcrypt is a cryptographic library for the TMS320C54x and other TI DSPs.

Known encryption algorithms are specified in the following documents:

- DES is specified by ANSI X3.92 and FIPS 46-2, operation modes are specified in ANSI X3.106 and FIPS 81)
- Triple DES is specified in ANSI X9.52 and FIPS 46-3.
- SHA-1 is in ANSI X9.30-2 and FIPS 180-1.
- HMAC-SHA-1 is in IETF RFC 2104.
- MD5 is in IETF RFC 1321.
- DSA is in ANSI X9.30-1 and FIPS 186.
- Diffie-Hellman is in ANSI X9.42

It should be noted that in one embodiment, memory 330 maintains a log of keys generated by encryption module 340 so that the multimedia output device 120 can always re-print the key that was lost by the intended recipient. To increase the level of security, in one embodiment, the multimedia output device 120 maintains a list of symmetric keys encrypted with a user's public key. This method of encryption is described below.

Module 540 is adapted to receive a key and encrypted content, such as the content generated by encryption logic module 530 and to decrypt the received encrypted content using the key. Module 540 is adapted to decrypt the content using any of the known decryption technique. Module 540 receives the key using any known technique, such as via a keyboard, scanning a bar code or using OCR with a key printed on paper. Module 540 is adapted to output decrypted content onto any medium specified by a user, such as an electronic medium, a network interface, or on paper.

Methods of Encryption

Figure 6:
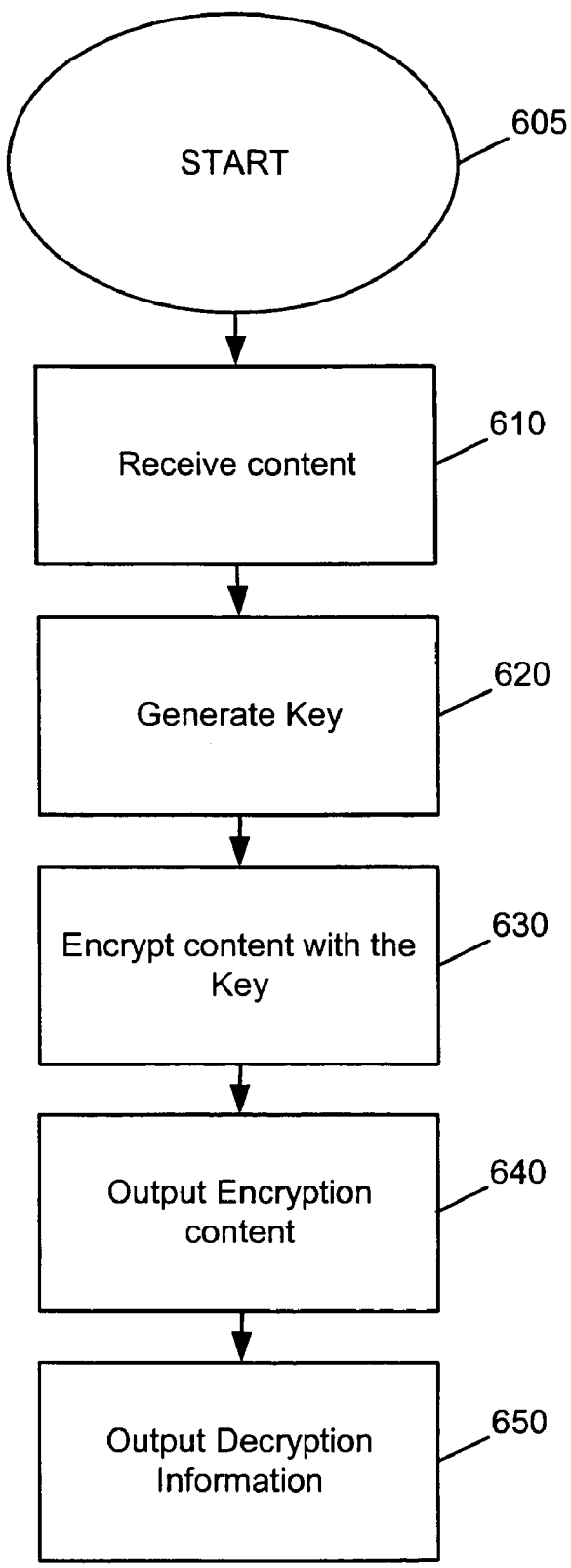
FIG. 6 is a flow chart of the embodiment in which symmetric key encryption is used.

FIG. 6 is a flow chart of an embodiment of the present invention in which a symmetric encryption method is used. As is known in the art, symmetric encryption is a type of encryption in which the same key is used to encrypt and decrypt data. The process starts 605 and the multimedia output device 120 receives 610 content from an external source. Encryption module 340 generates a key 620 and encrypts 630 the received content using the key. The multimedia output device 120 then outputs 640 the encrypted data. The multimedia output device 120 also outputs the key that is used to decrypt the content.

Figure 7A:
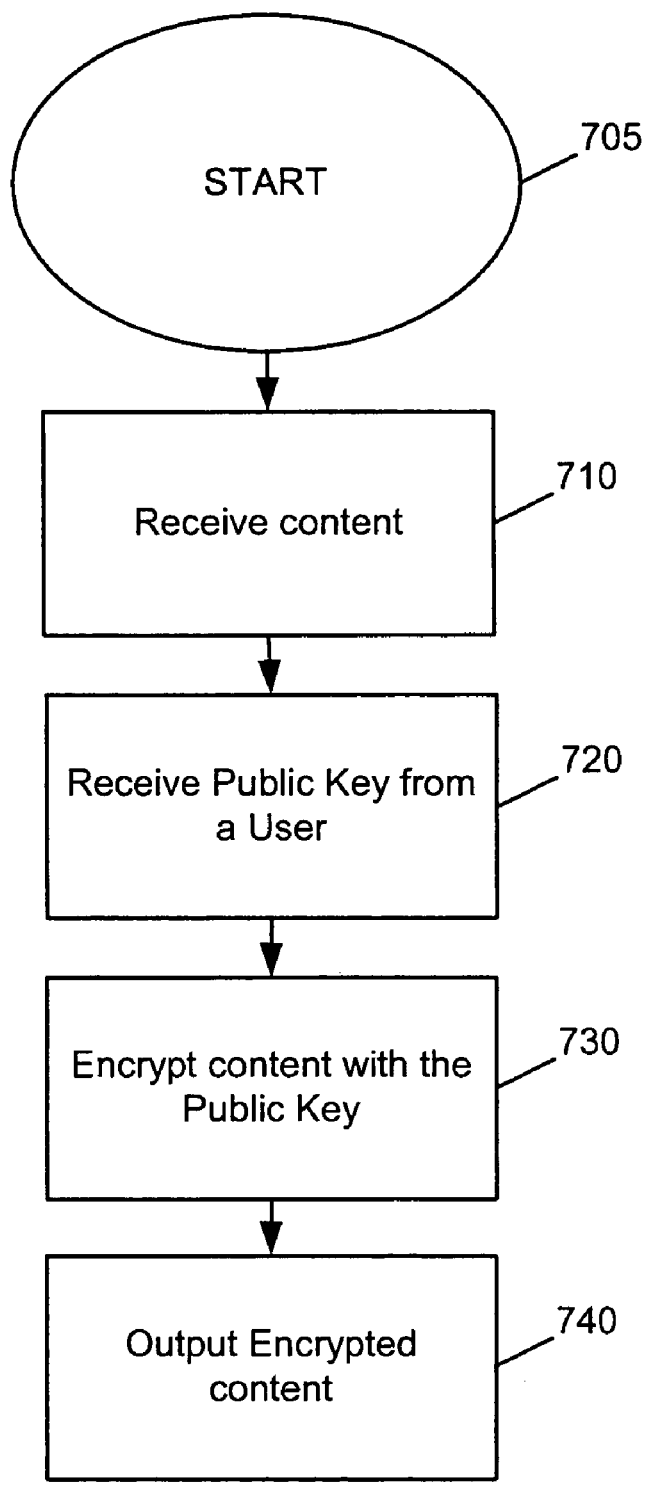
FIG. 7A is a flow chart of the embodiment in which public key encryption is used.

FIG. 7A is flow chart of an embodiment of the present invention in which a public key encryption method is used. As is known in the art, public key encryption is a type of encryption that uses a public/private key pair. The process starts 705 and the multimedia output device 120 receives 710 content from an external source. Encryption module 340 receives 720 a public key from a user. In an alternative embodiment, a public key is provided from other sources. Encryption module 340 then encrypts 730 the received content using the key. The multimedia output device 120 then outputs 740 the encrypted data. A recipient of the encrypted data will use his private key to decrypt the data. It should be noted that this method does not provide an output of the decryption information since the recipient already knows his own private key. The recipient needs to know his private key to decrypt the data.

Figure 7B:
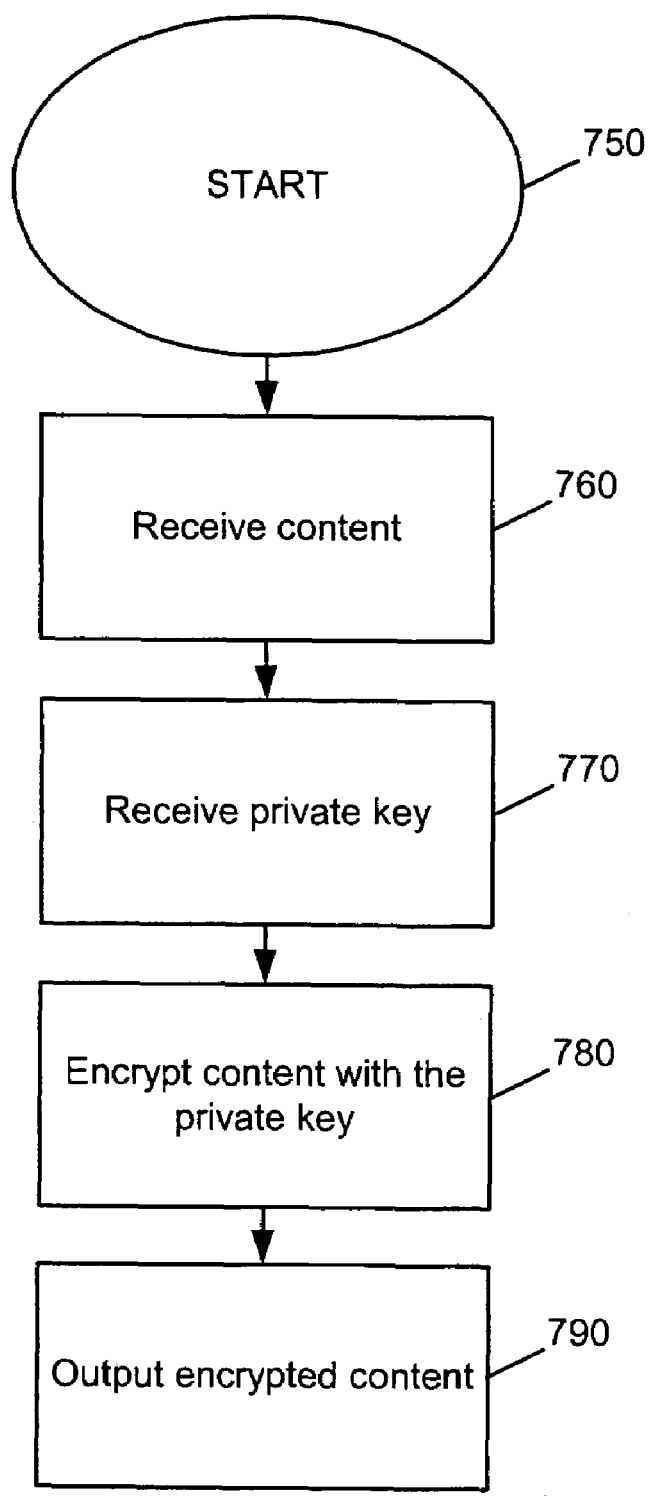
FIG. 7B is a flow chart of the embodiment in which content is encrypted using a user's private key.

FIG. 7B is a flow chart of an embodiment of the present invention in which content is encrypted using a user's private key. The process starts 750 and the multimedia output device 120 receives 760 content from an external source. Encryption module 340 receives 770 a private key from a user. In an alternative embodiment, a private key is provided from other sources. Encryption module 340 encrypts 780 the content using the private key, and outputs 790 encrypted content. The encrypted content is decrypted using a public key of a user. In an alternative embodiment, encryption module 340 runs a hash function on the received content and encrypts the hash with a user's private key. The hash function is a well-known cryptographic technique to provide a short sequence of bytes. In one embodiment, the encrypted hash is outputted along with the received content.

Figure 8:
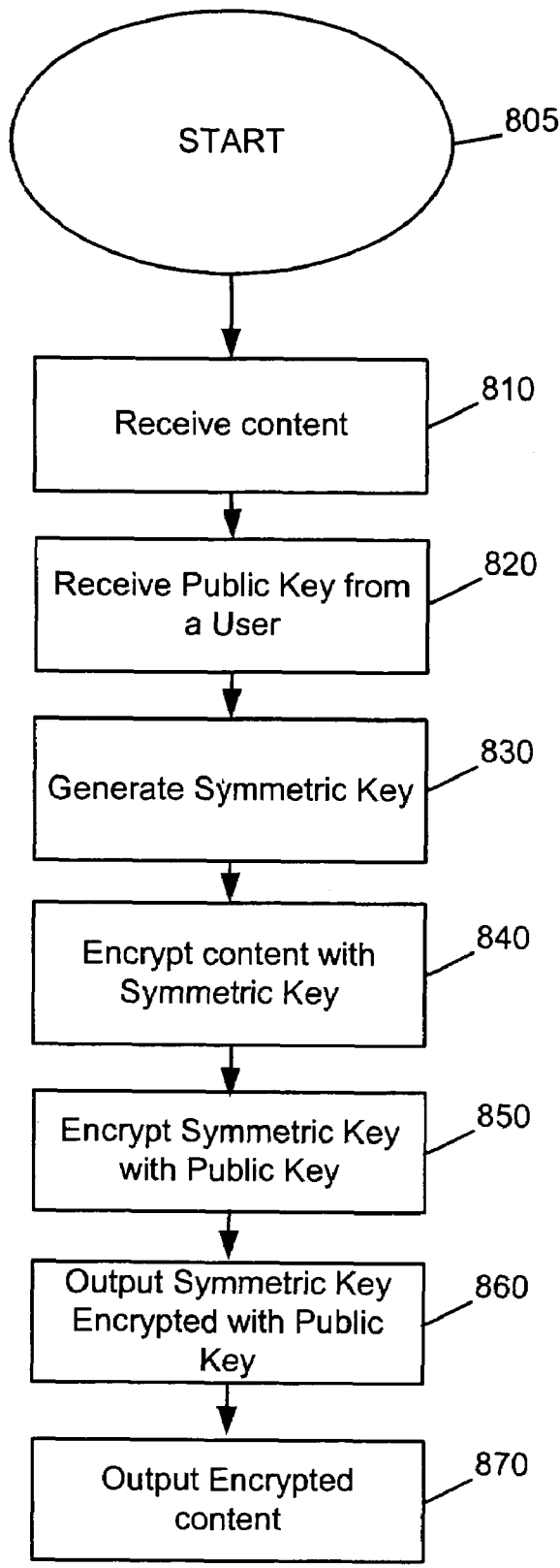
FIG. 8 is a flow chart of the embodiment in which symmetric key is encrypted with a public key.

FIG. 8 is a flow chart of an embodiment of the present invention in which encryption module 340 generates a key, encrypts the content with the key, and encrypts the generated key with a recipient's public key. The process starts 805 and the multimedia output device 120 receives 810 content from an external source. Encryption module 340 receives 820 a public key from a user and generates 830 a symmetric key. It should be noted that if the encrypted data is intended for someone other than a user, the user provides the public key of the intended recipient. Module 340 then encrypts 840 the received content with the generated symmetric key. In step 850, module 340 encrypts the generated symmetric key with the received public key. The multimedia output device 120 then provides 860 an output of the encrypted information, including the encrypted symmetric key that will be used to decrypt the symmetric key. The multimedia output device 120 then outputs 870 the encrypted content separately from the key. To decrypt the content, a user would have to decrypt the symmetric key with his private key and then decrypt the content with the symmetric key. It should be noted that the above process can be repeated with several distinct public keys, each key received from a different user, so that the symmetric key is encrypted as many times as the number of the provided public keys. Generating individual outputs for a set of users. allows each user to decrypt the content without the knowledge of another user's private key. This embodiment is utilized when documents need to be secure, yet shared among members of a group.

Figure 9:
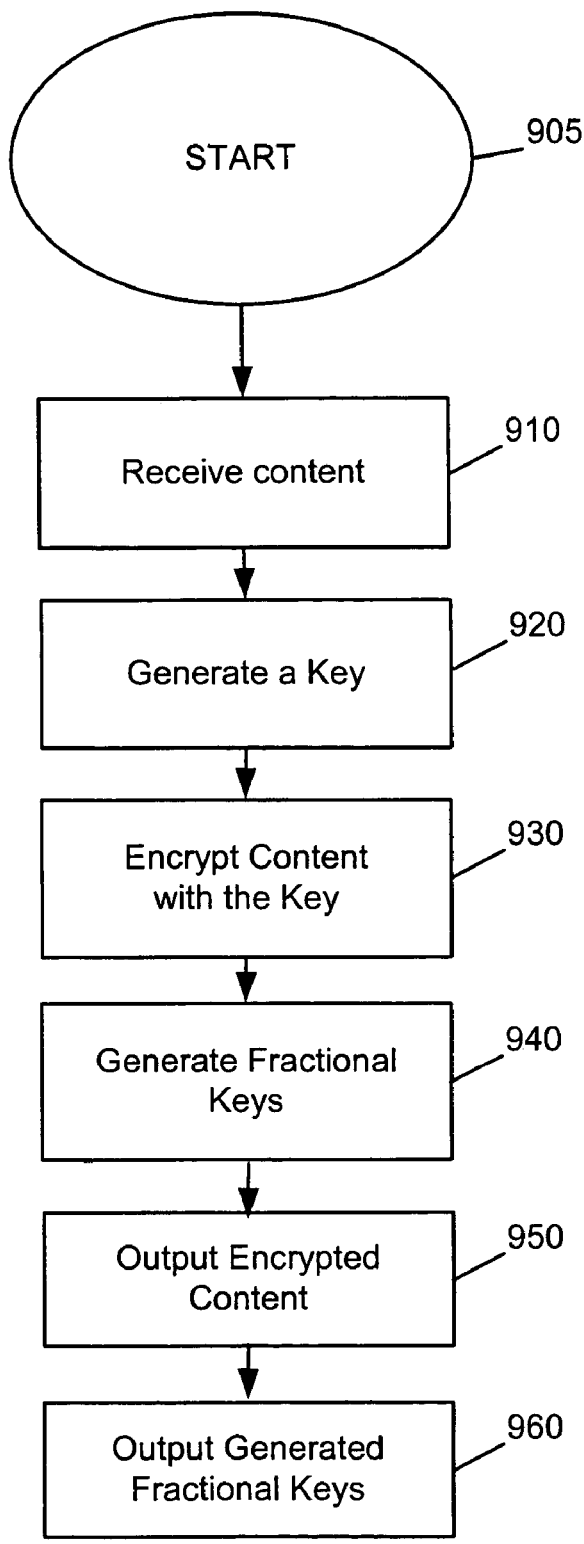
FIG. 9 is a flow diagram of the embodiment in which multiple keys are generated.

FIG. 9 is a flow chart of an alternative embodiment for encrypting the content. The process starts 905 and the multimedia output device 120 receives 910 content from an external source. Encryption module 340 generates 920 a key and encrypts 930 the content with the key. Encryption module 340 then generates 940 multiple fractional keys, each key containing a subset of the generated key. Fractional keys can be generated by any reversible method of decomposition which operates upon a sequence of bits. For example, a series of keys which will be combined bitwise by a Boolean XOR operation might be generated. Alternatively, the key could be divided bitwise into 2 or more contiguous sets of bits. Alternatively, an algorithm which divides the bit in some other way, such as choosing bits using module arithmetic, can be used. Any algorithm can be used, so long as the key is divided unambiguously into components which will be recombined according to some method in order for decryption to proceed. The multimedia output device 120 then outputs 950 the encrypted content. The multimedia output device 120 also outputs 960 each of the generated fractional keys that are used to decrypt the content. These keys can then be distributed and must be recombined in order for decryption to proceed. This embodiment can be utilized, for example, to provide a facility like a bank safety deposit box, where both a bank manager key and a customer key are required to open the box.

It should be noted that any of the steps, operations, or processes described herein can be performed or implemented with one or more software modules or hardware modules, alone or in combination with other devices.

Encryption of Audio Data

As previously described in reference to FIG. 3, output device 120 includes an embedded A/V content recognition module 370 which enables the output device 120 to recognize particular properties in the content and process the data based on the recognized content. Audio data may be represented in several ways. For example, intelligible conversations may be transcribed, and their contents printed out onto paper. In addition, descriptions of audio events along with the time and location of the event can also be depicted on paper. The functionality of A/V content recognition module 370 is described in a co-pending U.S. patent application entitled, "Printing System With Embedded Audio/Video Content Recognition and Processing," to Hull et. al., filed Mar. 30, 2004, Ser. No. 10/813,950, which application is incorporated by reference in its entirety.

Briefly, a speech recognition processing method is applied to the audio data. The text is printed on a paper document. A representation is provided that indexes the words or phrases that were recognized with high confidence. The print dialog box provides controls for modifying recognition thresholds and layout parameters.

In one embodiment of the present invention, the functionality of the A/V content recognition module 370 is embedded into the key and metadata generation module 520. Module 520 is adapted to produce various levels of detailed processing of the audio data, in response to a user selection, as described in more details in reference to FIG. 5. For example, module 520 is adapted to produce a transcript of the audio data or high confidence keywords that serve as a memory jog for the creator. In the latter case, the keywords would not reveal the contents of the audio data. As previously discussed in reference to FIGS. 2A and 5, a user, for example, selects an option that would print just a key for decrypting the encrypted content. This is the most secure way of outputting decryption information. A user, for example, selects an option that would provide for outputting of a few keywords of the encrypted content. In this case, if the document fell into unauthorized hands, such a printout might provide some clue to the nature of the encrypted data.

Encryption of Video Data

A/V content recognition module 370 produces various styles of video paper. Video paper is a system for multimedia browsing, analysis, and replay. Briefly, key frames are extracted from video data and printed on paper along with bar codes that allow for random access and reply. Video paper technology is described in "The Video Paper Multimedia Playback System", Jonathan J. Hull, Berna Erol, Jamey Graham, and Dar-Shyang Lee Ricoh Innovations, Inc. Module 370 is adapted to print one key frame for the whole video file. Alternatively, module 370 prints one key frame per clip. In an alternative embodiment, module 370 prints one key frame per scene. Yet in another embodiment, module 370 prints key frames along with closed caption transcript text. Each of these is adapted to include bar codes to replay the video.

In one embodiment, the functionality of the A/V module to generate various styles of video paper is embedded into module 520. Module 520 is adapted to produce various levels of detailed processing of the video data, in response to a user selection, as described in more details in reference to FIG. 5. If, for example, a user selected an option that would provide for outputting key frames from video data along with a key, module 520 generates an output that would include the key frames along with the key.

It should be noted that the key and metadata module 520 is also adapted to generate separate keys for different segments, video clips, speakers, or parts of a recorded meeting (such that one key is generated for video data, one for audio data, one for power point, and one for whiteboard). In addition, some recipients are given the keys selectively for certain parts of the content.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above teachings. It is therefore intended that the scope of the invention be limited not by this detailed description, but rather by the claims appended hereto.

We claim:

1. A printer for outputting content in an encrypted form, the printer comprising:
    an interface for receiving the content from an external source;
    an encryption module, coupled to the interface to receive the content to be encrypted and to encrypt the content;
    a first output system in communication with the encryption module to receive the encrypted content and produce a first output of the encrypted content.

2. The printer of claim 1, wherein the encryption module further comprises:
    a metadata generation module for receiving the content to be encrypted and a user selection of a level of security with which decryption information should be outputted, and for generating the decryption information based on the received content and in response to the user selection.

3. The printer of claim 2, further comprising:
    a second output system in communication with the metadata generation module to receive the decryption information and to produce a printed output of the decryption information.

4. The printer of claim 2, wherein the decryption information is a key.

5. The printer of claim 2, wherein the decryption information is an identifier of an electronic output of the encrypted content.

6. The printer of claim 2, wherein the decryption information is a description of the content of the encrypted content.

7. The printer of claim 2, wherein the first output system is further adapted to receive generated decryption information and produce an electronic output of the decryption information.

8. The printer of claim 1, wherein the interface comprises an embedded audio recorder, wherein the external source of content is a series of sounds that are converted into an electrical format by the embedded audio recorder and then provided to the content processing system.

9. The printer of claim 1, wherein the first output system is configured to write the electronic representation to a removable media storage device.

10. The printer of claim 9, wherein the removable storage device is selected from a group consisting of: a DVD, a video cassette tape, a CD, an audio cassette tape, a flash card, a computer disk, an SD disk, and a computer-readable medium.

11. The printer of claim 1, wherein the first output system comprises a media writer.

12. The printer of claim 1, wherein the first output system comprises an embedded web page display.

13. The printer of claim 1, wherein the encryption module is further adapted to generate a key and to encrypt the content using the generated key.

14. The printer of claim 13, wherein the printer further comprises a memory for storing the generated key.

15. The printer of claim 1, wherein the encryption module is further adapted to generate a plurality of fractional keys, each fractional key containing a subset of the generated key.

16. The printer of claim 1, wherein the encryption module is further adapted to receive a key, from an external source, and to encrypt the content using the received key.

17. The printer of claim 1, wherein the encryption module is further adapted to decrypt the content.

18. The printer of claim 1, wherein the encryption module is further adapted to encrypt the content using a user private key.

19. The printer of claim 1, wherein the encryption module is further adapted to:
 receive, from a source, a public key of an intended recipient,
 generate a symmetric key,
 encrypt the content with the symmetric key, and
 encrypt the symmetric key with the public key.

20. The printer of claim 19, wherein the second output system is further adapted to receive the encrypted symmetric key and to produce a printed output of the encrypted symmetric key.

21. The printer of claim 19, wherein the encryption module is further adapted to receive a plurality of public keys and to encrypt the symmetric key with each received public key.

22. The printer of claim 1, wherein the encryption module is further adapted to generate a plurality of keys, each key is designated to encrypt a corresponding segment of the content.

23. The printer of claim 1, wherein the interface comprises a removable content storage reader.

24. The printer of claim 1, wherein the interface comprises a video input device selected from a group consisting of: a DVD reader, a video cassette tape reader, and a flash card reader.

25. The printer of claim 1, wherein the interface comprises an audio input device selected from a group consisting of: a CD reader, an audio cassette tape reader, and a flash card reader.

26. The printer of claim 1, wherein the interface comprises an embedded receiver selected from a group consisting of: an embedded TV receiver, an embedded radio receiver, an embedded short-wave radio receiver, an embedded satellite radio receiver, an embedded two-way radio, and an embedded cellular phone.

27. The printer of claim 1, wherein the interface comprises an embedded video recorder, wherein the external source of content is a series of images captured by embedded the video recorder, converted into an electrical format, and then provided to the content processing system.

28. A method for outputting encrypted content, the method comprising:
 receiving unencrypted content from a source;
 encrypting the content, by a printer, to generate a first output of the encrypted content; and
 producing the first output of the encrypted content.

29. The method of claim 28, further comprising:
 generating a key used to decrypt the content; and
 encrypting the content, using the generated key.

30. The method of claim 29, further comprising a step of generating a plurality of fractional keys, each fractional key containing a subset of the generated key.

31. The method of claim 29, further comprising a step of decrypting the encrypted content using the generated key.

32. The method of claim 29, further comprising generating a plurality of keys used to decrypt the content, each generated key is designated to decrypt a corresponding segment of the content.

33. The method of claim 28, further comprising:
 receiving a user's private key; and
 encrypting the content using the private key.

34. The method of claim 28, further comprising:
 receiving a user selection of a level of security with which decryption information should be outputted;
 generating a decryption information, based on the unencrypted content and in response to the user selection; and
 producing a second output of the decryption information.

35. The method of claim 34, wherein producing the second output further comprises producing an electronic output.

36. The method of claim 34, wherein producing the second output further comprises producing a paper output.

37. The method of claim 34, wherein the decryption information is an identifier of the first output of the encrypted content.

38. The method of claim 34, wherein the decryption information is a description of the content of the encrypted content.

39. The method of claim 34, wherein the decryption information is a key used to decrypt the encrypted content.

40. The method of claim 28, wherein the source comprises one selected from the group consisting of:
 a scanner;
 a video device;
 an audio device;
 a memory card;
 a storage device;
 a facsimile source;
 an email source; and
 a wireless source.

41. The method of claim 28, wherein producing the first output further comprises producing an electronic output.

42. The method of claim 28, wherein producing the first output further comprises producing a paper output.

43. The method of claim 28, further comprising:
receiving, from a source, a public key of an intended recipient;
generating a symmetric key;
encrypting the content with the symmetric key; and
encrypting the symmetric key with the public key.

44. The method of claim 28, further comprising:
receiving a plurality of public keys; and
encrypting the symmetric key with each received public key.

45. A computer program product comprising a computer-readable medium containing computer program code for performing any one of the methods of claims 28 through 44.

* * * * *